US 9,853,704 B2

(12) United States Patent
Kang et al.

(10) Patent No.: US 9,853,704 B2
(45) Date of Patent: Dec. 26, 2017

(54) METHOD FOR REPORTING CHANNEL STATE INFORMATION FOR THREE DIMENSIONAL BEAMFORMING IN WIRELESS COMMUNICATION SYSTEM AND APPARATUS FOR SAME

(71) Applicant: LG ELECTRONICS INC., Seoul (KR)

(72) Inventors: Jiwon Kang, Seoul (KR); Kilbom Lee, Seoul (KR); Hyunsoo Ko, Seoul (KR); Jaehoon Chung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 86 days.

(21) Appl. No.: 14/889,389

(22) PCT Filed: Apr. 30, 2014

(86) PCT No.: PCT/KR2014/003855
§ 371 (c)(1),
(2) Date: Nov. 5, 2015

(87) PCT Pub. No.: WO2014/182002
PCT Pub. Date: Nov. 13, 2014

(65) Prior Publication Data
US 2016/0087708 A1    Mar. 24, 2016

Related U.S. Application Data

(60) Provisional application No. 61/820,177, filed on May 7, 2013.

(51) Int. Cl.
*H04B 7/06* (2006.01)

(52) U.S. Cl.
CPC ......... *H04B 7/0617* (2013.01); *H04B 7/0619* (2013.01); *H04B 7/0621* (2013.01); *H04B 7/0626* (2013.01); *H04B 7/0639* (2013.01)

(58) Field of Classification Search
CPC .. H04B 7/0617; H04B 7/0619; H04B 7/0621; H04B 7/0626; H04B 7/0639
(Continued)

(56) References Cited

U.S. PATENT DOCUMENTS

2011/0116432 A1* 5/2011 Doppler ................ H04B 7/155
370/312
2011/0243026 A1    10/2011 Kim et al.
(Continued)

FOREIGN PATENT DOCUMENTS

KR    10-2010-0044258    4/2010
KR    10-2012-0036698    4/2012
(Continued)

OTHER PUBLICATIONS

European Patent Office Application Serial No. 14795428.3, Search Report dated Dec. 5, 2016, 10 pages.
(Continued)

*Primary Examiner* — Stephen J Clawson
(74) *Attorney, Agent, or Firm* — Lee Hong Degerman Kang Waimey

(57) ABSTRACT

Discloses is a method in which a user equipment (UE) reports channel state information to an evolved Node B (eNB) for beamforming based on multiple antennas in a wireless communication system. Specifically, the method comprises the steps of: receiving information on a plurality of reference signal resources from the eNB; generating channel state information containing information related to one preferred precoder to be applied to the plurality of reference signal resources in common and information related to one linking precoder for connecting the plurality of reference signal resources; and reporting the channel state information to the eNB, wherein the multiple antennas are partitioned into sections of row or column units and the
(Continued)

plurality of reference signal resources correspond to the sections.

17 Claims, 16 Drawing Sheets

(58) Field of Classification Search
USPC .......................................................... 370/312
See application file for complete search history.

(56) References Cited

U.S. PATENT DOCUMENTS

| | | | |
|---|---|---|---|
| 2012/0275530 A1 | 11/2012 | Nazar et al. | |
| 2013/0088949 A1 | 4/2013 | Zhang et al. | |
| 2013/0107916 A1* | 5/2013 | Liu | H04B 7/0452 375/219 |
| 2013/0308715 A1* | 11/2013 | Nam | H04B 7/0469 375/267 |
| 2014/0029684 A1* | 1/2014 | Shirani-Mehr | H04B 7/0469 375/267 |
| 2014/0286182 A1* | 9/2014 | Chen | H04L 5/0023 370/252 |
| 2015/0341091 A1* | 11/2015 | Park | H04B 7/0456 375/267 |
| 2015/0341099 A1* | 11/2015 | Kang | H04B 7/0626 375/267 |
| 2016/0056875 A1* | 2/2016 | Kang | H04B 7/0456 370/329 |
| 2016/0072562 A1* | 3/2016 | Onggosanusi | H04B 7/0478 370/329 |
| 2016/0080052 A1* | 3/2016 | Li | H04B 7/0456 375/267 |
| 2016/0080058 A1* | 3/2016 | Kang | H04B 7/0617 370/329 |

FOREIGN PATENT DOCUMENTS

| | | |
|---|---|---|
| WO | 2013024350 | 2/2013 |
| WO | 2014099341 | 6/2014 |

OTHER PUBLICATIONS

Alcatel-Lucent, "Considerations on CSI feedback enhancements for high-priority antenna configurations", R1-112420, 3GPP TSG-RAN WG1 #66, Aug. 2011, 7 pages.

Samsung, "Further discussion on quasi co-location of CSI-RS and CRS", R1-124913, 3GPP TSG-RAN WG1 Meeting #71, Nov. 2012, 12 pages.

PCT International Application No. PCT/KR2014/003855, Written Opinion of the International Searching Authority dated Aug. 22, 2014, 16 pages.

* cited by examiner (A) CONTROL-PLANE PROTOCOL STACK (B) USER-PLANE PROTOCOL STACK

▨ : DMRS GROUP 1

▩ : DMRS GROUP 2

(a) CONVENTIONAL ANTENNA SYSTEM             (b) AAS

METHOD FOR REPORTING CHANNEL STATE INFORMATION FOR THREE DIMENSIONAL BEAMFORMING IN WIRELESS COMMUNICATION SYSTEM AND APPARATUS FOR SAME

CROSS-REFERENCE TO RELATED APPLICATIONS

This application is the National Stage filing under 35 U.S.C. 371 of International Application No. PCT/KR2014/003855, filed on Apr. 30, 2014, which claims the benefit of U.S. Provisional Application No. 61/820,177, filed on May 7, 2013, the contents of which are all hereby incorporated by reference herein in their entirety.

TECHNICAL FIELD

The present invention relates to a wireless communication system, and more particularly, to a method of reporting channel state information for three dimensional beamforming in a wireless communication system and an apparatus therefor.

BACKGROUND ART

A brief description will be given of a 3rd Generation Partnership Project Long Term Evolution (3GPP LTE) system as an example of a wireless communication system to which the present invention can be applied.

FIG. 1 illustrates a configuration of an Evolved Universal Mobile Telecommunications System (E-UMTS) network as an exemplary wireless communication system. The E-UMTS system is an evolution of the legacy UMTS system and the 3GPP is working on the basics of E-UMTS standardization. E-UMTS is also called an LTE system. For details of the technical specifications of UMTS and E-UMTS, refer to Release 7 and Release 8 of "3rd Generation Partnership Project; Technical Specification Group Radio Access Network", respectively.

Referring to FIG. 1, the E-UMTS system includes a User Equipment (UE), an evolved Node B (eNode B or eNB), and an Access Gateway (AG) which is located at an end of an Evolved UMTS Terrestrial Radio Access Network (E-UTRAN) and connected to an external network. The eNB may transmit multiple data streams simultaneously, for broadcast service, multicast service, and/or unicast service.

A single eNB manages one or more cells. A cell is set to operate in one of the bandwidths of 1.25, 2.5, 5, 10, 15 and 20 Mhz and provides Downlink (DL) or Uplink (UL) transmission service to a plurality of UEs in the bandwidth. Different cells may be configured so as to provide different bandwidths. An eNB controls data transmission and reception to and from a plurality of UEs. Regarding DL data, the eNB notifies a particular UE of a time-frequency area in which the DL data is supposed to be transmitted, a coding scheme, a data size, Hybrid Automatic Repeat reQuest (HARQ) information, etc. by transmitting DL scheduling information to the UE. Regarding UL data, the eNB notifies a particular UE of a time-frequency area in which the UE can transmit data, a coding scheme, a data size, HARQ information, etc. by transmitting UL scheduling information to the UE. An interface for transmitting user traffic or control traffic may be defined between eNBs. A Core Network (CN) may include an AG and a network node for user registration of UEs. The AG manages the mobility of UEs on a Tracking Area (TA) basis. A TA includes a plurality of cells.

While the development stage of wireless communication technology has reached LTE based on Wideband Code Division Multiple Access (WCDMA), the demands and expectation of users and service providers are increasing. Considering that other radio access technologies are under development, a new technological evolution is required to achieve future competitiveness. Specifically, cost reduction per bit, increased service availability, flexible use of frequency bands, a simplified structure, an open interface, appropriate power consumption of UEs, etc. are required.

DISCLOSURE OF THE INVENTION

Technical Task

A technical task of the present invention is to provide a method of reporting channel state information for three dimensional beamforming in a wireless communication and an apparatus therefor based on the discussion mentioned earlier in the foregoing description.

Technical Solution

To achieve these objects and other advantages and in accordance with the purpose of the invention, a method of reporting channel state information reported to a base station by a user equipment for beamforming based on multiple antennas in a wireless communication system, comprising: receiving information on a plurality of reference signal resources from the base station; generating channel state information containing information on a single preferred precoder to be commonly applied to a plurality of the reference signal resources and information on a single linking precoder for linking a plurality of the reference signal resources; and reporting the channel state information to the base station, wherein the multiple antennas are partitioned by partitions of a row unit or partitions of a column unit and wherein a plurality of the reference signal resources correspond to the partitions.

In another aspect of the present invention, the channel state information comprises a rank indicator and the rank indicator indicates an optimized rank when the single preferred precoder and the single linking precoder are applied. the channel state information comprises a single channel quality indicator, and the single channel quality indicator indicates channel quality when the single preferred precoder, the single linking precoder and the optimized rank are applied.

In another aspect of the present invention, QCL (quasi co-located) assumption of a plurality of the reference signal resources is available. A method further comprising: receiving information on whether the QCL (quasi co-located) assumption of a plurality of the reference resources is available from the base station. A plurality of the reference signal resources of which the QCL assumption is available are considered as a large scale property is identical to each other. The large scale property comprises at least one of Doppler spread, Doppler shift, average delay, and delay spread.

In another aspect of the present invention, the partitions are in a perfectly aligned state.

In another aspect of the present invention, a method of receiving channel state information received from a user equipment by a base station for beamforming based on multiple antennas in a wireless communication system, comprising: transmitting information on a plurality of reference signal resources to the user equipment; and receiving channel state information containing information on a single preferred precoder to be commonly applied to a plurality of the reference signal resources and information on a single linking precoder for linking a plurality of the reference signal resources, wherein the multiple antennas are partitioned by partitions of a row unit or partitions of a column unit and wherein a plurality of the reference signal resources correspond to the partitions.

Advantageous Effects

According to embodiments of the present invention, it is able to efficiently report channel state information for three dimensional beamforming in a wireless communication system.

Effects obtainable from the present invention may be non-limited by the above mentioned effect. And, other unmentioned effects can be clearly understood from the following description by those having ordinary skill in the technical field to which the present invention pertains.

BEST MODE

Mode for Invention

The configuration, operation, and other features of the present invention will readily be understood with embodiments of the present invention described with reference to the attached drawings. Embodiments of the present invention as set forth herein are examples in which the technical features of the present invention are applied to a 3rd Generation Partnership Project (3GPP) system.

While embodiments of the present invention are described in the context of Long Term Evolution (LTE) and LTE-Advanced (LTE-A) systems, they are purely exemplary. Therefore, the embodiments of the present invention are applicable to any other communication system as long as the above definitions are valid for the communication system. In addition, while the embodiments of the present invention are described in the context of Frequency Division Duplexing (FDD), they are also readily applicable to Half-FDD (H-FDD) or Time Division Duplexing (TDD) with some modifications.

The term 'Base Station (BS)' may be used to cover the meanings of terms including Remote Radio Head (RRH), evolved Node B (eNB or eNode B), Reception Point (RP), relay, etc.

Figure 1:
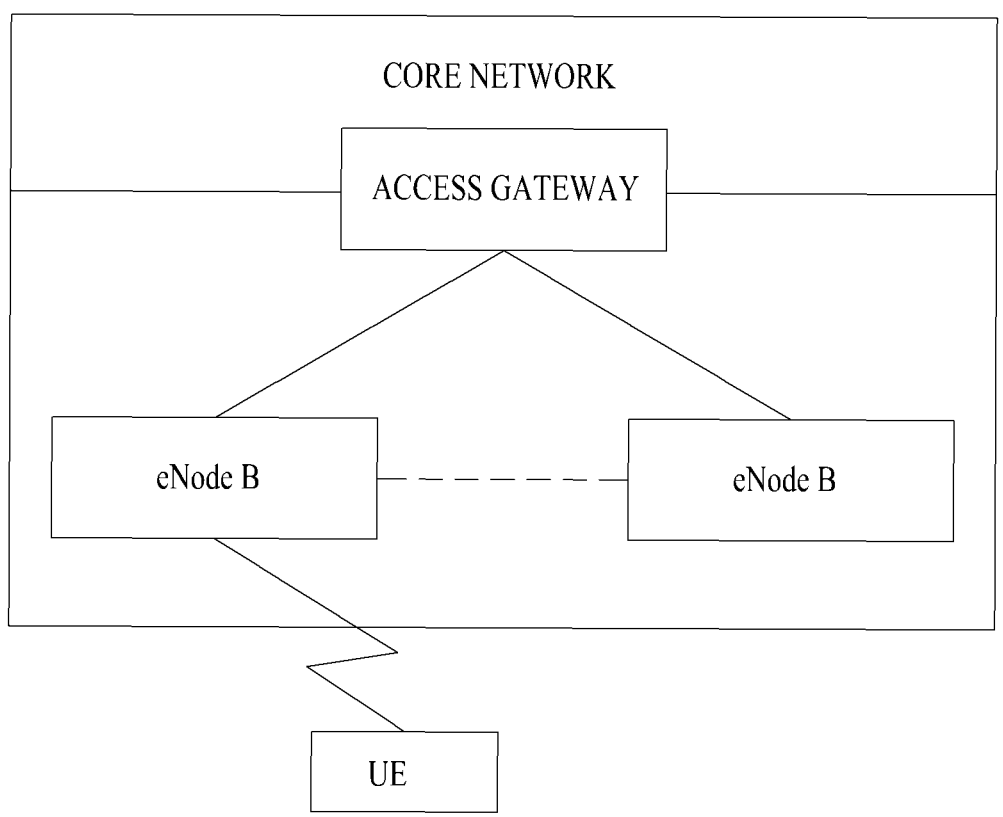
FIG. 1 is a diagram schematically illustrating a network structure of an E-UMTS as an exemplary radio communication system.
Figure 2:
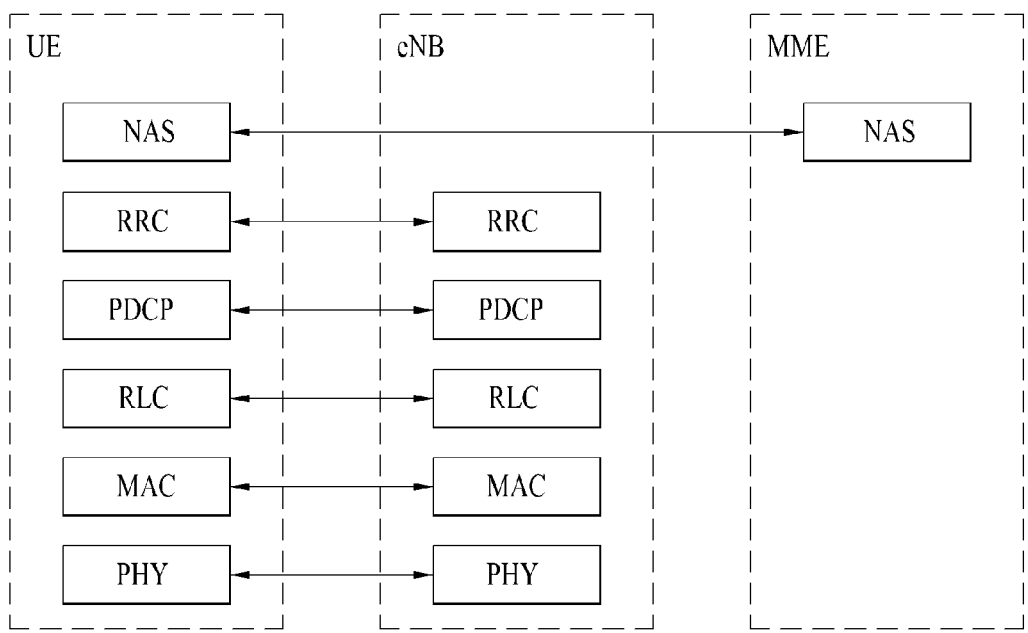
FIG. 2 is a diagram illustrating structures of a control plane and a user plane of a radio interface protocol between a UE and an E-UTRAN based on the 3GPP radio access network specification.
Figure 2:
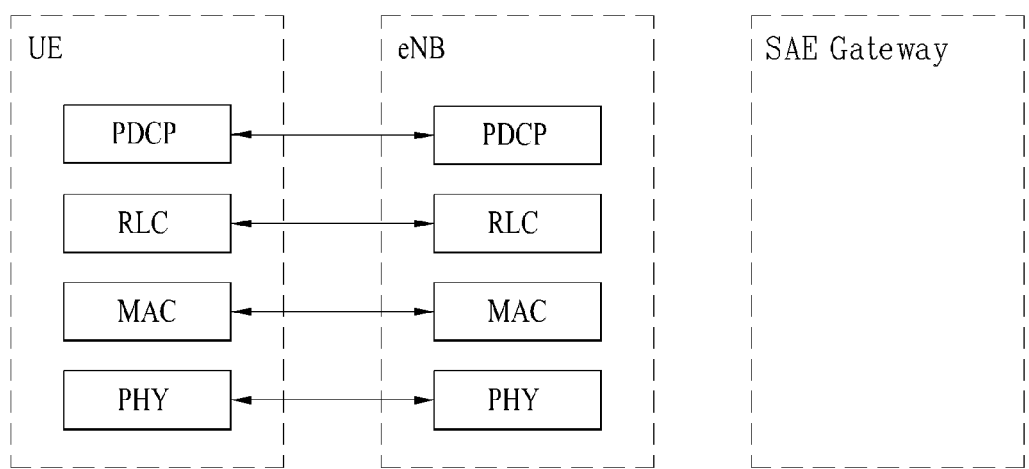

FIG. 2 illustrates control-plane and user-plane protocol stacks in a radio interface protocol architecture conforming to a 3GPP wireless access network standard between a User Equipment (UE) and an Evolved UMTS Terrestrial Radio Access Network (E-UTRAN). The control plane is a path in which the UE and the E-UTRAN transmit control messages to manage calls, and the user plane is a path in which data generated from an application layer, for example, voice data or Internet packet data is transmitted.

A PHYsical (PHY) layer at Layer 1 (L1) provides information transfer service to its higher layer, a Medium Access Control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in Orthogonal Frequency Division Multiple Access (OFDMA) for Downlink (DL) and in Single Carrier Frequency Division Multiple Access (SC-FDMA) for Uplink (UL).

The MAC layer at Layer 2 (L2) provides service to its higher layer, a Radio Link Control (RLC) layer via logical channels. The RLC layer at L2 supports reliable data transmission. RLC functionality may be implemented in a function block of the MAC layer. A Packet Data Convergence Protocol (PDCP) layer at L2 performs header compression to reduce the amount of unnecessary control information and thus efficiently transmit Internet Protocol (IP) packets such as IP version 4 (IPv4) or IP version 6 (IPv6) packets via an air interface having a narrow bandwidth.

A Radio Resource Control (RRC) layer at the lowest part of Layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

DL transport channels used to deliver data from the E-UTRAN to UEs include a Broadcast Channel (BCH) carrying system information, a Paging Channel (PCH) carrying a paging message, and a Shared Channel (SCH) carrying user traffic or a control message. DL multicast traffic or control messages or DL broadcast traffic or control messages may be transmitted on a DL SCH or a separately defined DL Multicast Channel (MCH). UL transport channels used to deliver data from a UE to the E-UTRAN include a Random Access Channel (RACH) carrying an initial control message and a UL SCH carrying user traffic or a control message. Logical channels that are defined above transport channels and mapped to the transport channels include a Broadcast Control Channel (BCCH), a Paging Control Channel (PCCH), a Common Control Channel (CCCH), a Multicast Control Channel (MCCH), a Multicast Traffic Channel (MTCH), etc.

Figure 3:
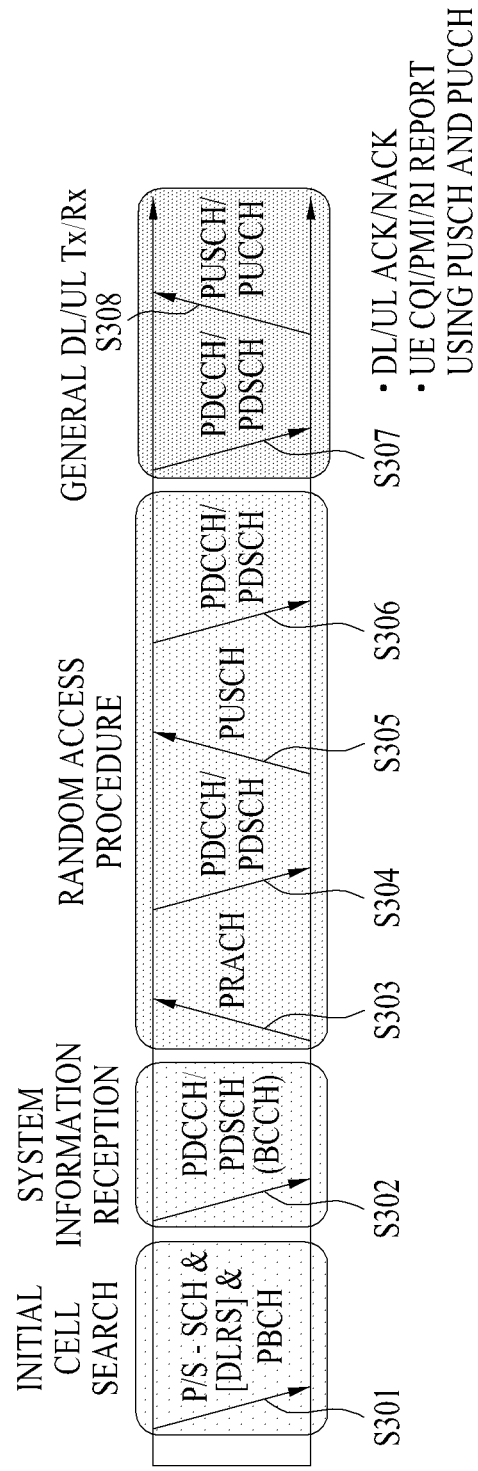
FIG. 3 is a diagram illustrating physical channels used in a 3GPP system and a general signal transmission method using the same.

FIG. 3 illustrates physical channels and a general method for transmitting signals on the physical channels in the 3GPP system.

Referring to FIG. 3, when a UE is powered on or enters a new cell, the UE performs initial cell search (S301). The initial cell search involves acquisition of synchronization to an eNB. Specifically, the UE synchronizes its timing to the eNB and acquires a cell Identifier (ID) and other information by receiving a Primary Synchronization Channel (P-SCH) and a Secondary Synchronization Channel (S-SCH) from the eNB. Then the UE may acquire information broadcast in the cell by receiving a Physical Broadcast Channel (PBCH) from the eNB. During the initial cell search, the UE may monitor a DL channel state by receiving a DownLink Reference Signal (DL RS).

After the initial cell search, the UE may acquire detailed system information by receiving a Physical Downlink Control Channel (PDCCH) and receiving a Physical Downlink Shared Channel (PDSCH) based on information included in the PDCCH (S302).

If the UE initially accesses the eNB or has no radio resources for signal transmission to the eNB, the UE may perform a random access procedure with the eNB (S303 to S306). In the random access procedure, the UE may transmit a predetermined sequence as a preamble on a Physical Random Access Channel (PRACH) (S303 and S305) and may receive a response message to the preamble on a PDCCH and a PDSCH associated with the PDCCH (S304 and S306). In the case of a contention-based RACH, the UE may additionally perform a contention resolution procedure.

After the above procedure, the UE may receive a PDCCH and/or a PDSCH from the eNB (S307) and transmit a Physical Uplink Shared Channel (PUSCH) and/or a Physical Uplink Control Channel (PUCCH) to the eNB (S308), which is a general DL and UL signal transmission procedure. Particularly, the UE receives Downlink Control Information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL ACKnowledgment/Negative ACKnowledgment (ACK/NACK) signal, a Channel Quality Indicator (CQI), a Precoding Matrix Index (PMI), a Rank Indicator (RI), etc. In the 3GPP LTE system, the UE may transmit control information such as a CQI, a PMI, an RI, etc. on a PUSCH and/or a PUCCH.

Figure 4:
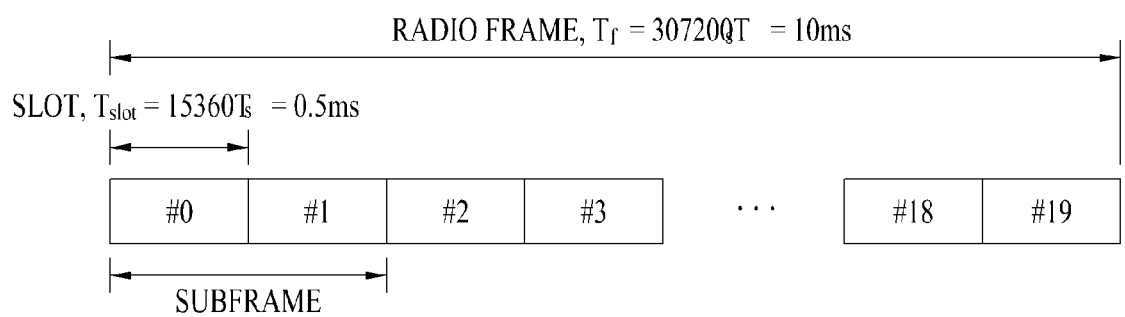
FIG. 4 is a diagram illustrating a structure of a radio frame used in an LTE system.

FIG. 4 illustrates a structure of a radio frame used in the LTE system.

Referring to FIG. 4, a radio frame is 10 ms (327200×Ts) long and divided into 10 equal-sized subframes. Each subframe is 1 ms long and further divided into two slots. Each time slot is 0.5 ms (15360×Ts) long. Herein, Ts represents a sampling time and $Ts=1/(15\ kHz\times 2048)=3.2552\times 10^{-8}$ (about 33 ns). A slot includes a plurality of Orthogonal Frequency Division Multiplexing (OFDM) symbols or SC-FDMA symbols in the time domain by a plurality of Resource Blocks (RBs) in the frequency domain. In the LTE system, one RB includes 12 subcarriers by 7 (or 6) OFDM symbols. A unit time during which data is transmitted is defined as a Transmission Time Interval (TTI). The TTI may be defined in units of one or more subframes. The above-described radio frame structure is purely exemplary and thus the number of subframes in a radio frame, the number of slots in a subframe, or the number of OFDM symbols in a slot may vary.

Figure 5:
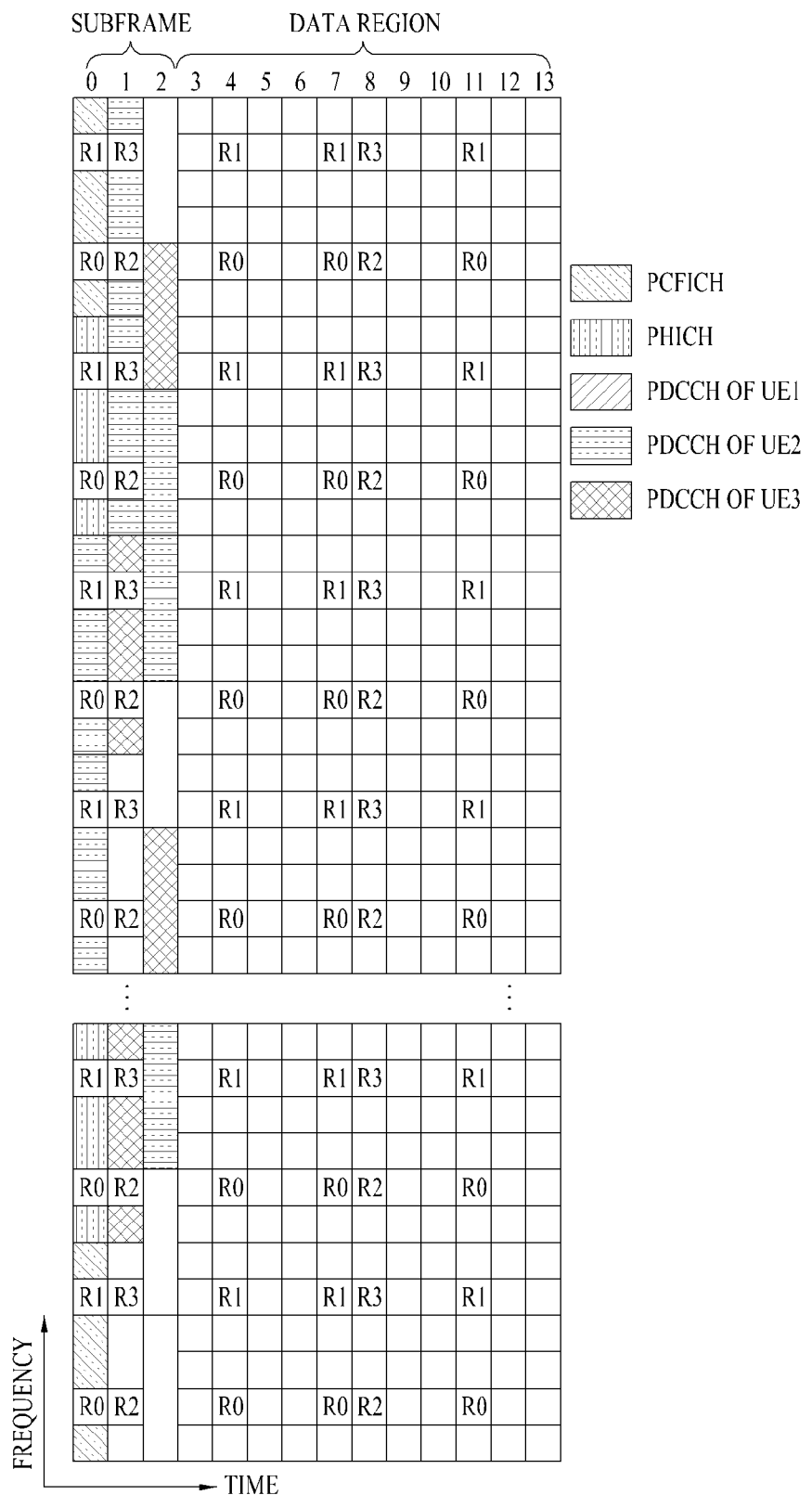
FIG. 5 is a diagram illustrating a structure of a DL radio frame used in an LTE system.

FIG. 5 illustrates exemplary control channels included in a control region of a subframe in a DL radio frame.

Referring to FIG. 5, a subframe includes 14 OFDM symbols. The first one to three OFDM symbols of a subframe are used for a control region and the other 13 to 11 OFDM symbols are used for a data region according to a subframe configuration. In FIG. 5, reference characters R1 to R4 denote RSs or pilot signals for antenna 0 to antenna 3. RSs are allocated in a predetermined pattern in a subframe irrespective of the control region and the data region. A control channel is allocated to non-RS resources in the control region and a traffic channel is also allocated to non-RS resources in the data region. Control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH is a physical control format indicator channel carrying information about the number of OFDM symbols used for PDCCHs in each subframe. The PCFICH is located in the first OFDM symbol of a subframe and configured with priority over the PHICH and the PDCCH. The PCFICH includes 4 Resource Element Groups (REGs), each REG being distributed to the control region based on a cell Identity (ID). One REG includes 4 Resource Elements (REs). An RE is a minimum physical resource defined by one subcarrier by one OFDM symbol. The PCFICH is set to 1 to 3 or 2 to 4 according to a bandwidth. The PCFICH is modulated in Quadrature Phase Shift Keying (QPSK).

The PHICH is a physical Hybrid-Automatic Repeat and request (HARQ) indicator channel carrying an HARQ ACK/NACK for a UL transmission. That is, the PHICH is a channel that delivers DL ACK/NACK information for UL HARQ. The PHICH includes one REG and is scrambled cell-specifically. An ACK/NACK is indicated in one bit and modulated in Binary Phase Shift Keying (BPSK). The modulated ACK/NACK is spread with a Spreading Factor (SF) of 2 or 4. A plurality of PHICHs mapped to the same resources form a PHICH group. The number of PHICHs multiplexed into a PHICH group is determined according to the number of spreading codes. A PHICH (group) is repeated three times to obtain a diversity gain in the frequency domain and/or the time domain.

The PDCCH is a physical DL control channel allocated to the first n OFDM symbols of a subframe. Herein, n is 1 or a larger integer indicated by the PCFICH. The PDCCH occupies one or more CCEs. The PDCCH carries resource allocation information about transport channels, PCH and DL-SCH, a UL scheduling grant, and HARQ information to each UE or UE group. The PCH and the DL-SCH are transmitted on a PDSCH. Therefore, an eNB and a UE transmit and receive data usually on the PDSCH, except for specific control information or specific service data.

Information indicating one or more UEs to receive PDSCH data and information indicating how the UEs are supposed to receive and decode the PDSCH data are delivered on a PDCCH. For example, on the assumption that the Cyclic Redundancy Check (CRC) of a specific PDCCH is masked by Radio Network Temporary Identity (RNTI) "A" and information about data transmitted in radio resources (e.g. at a frequency position) "B" based on transport format information (e.g. a transport block size, a modulation scheme, coding information, etc.) "C" is transmitted in a specific subframe, a UE within a cell monitors, that is, blind-decodes a PDCCH using its RNTI information in a search space. If one or more UEs have RNTI "A", these UEs receive the PDCCH and receive a PDSCH indicated by "B" and "C" based on information of the received PDCCH.

Figure 6:
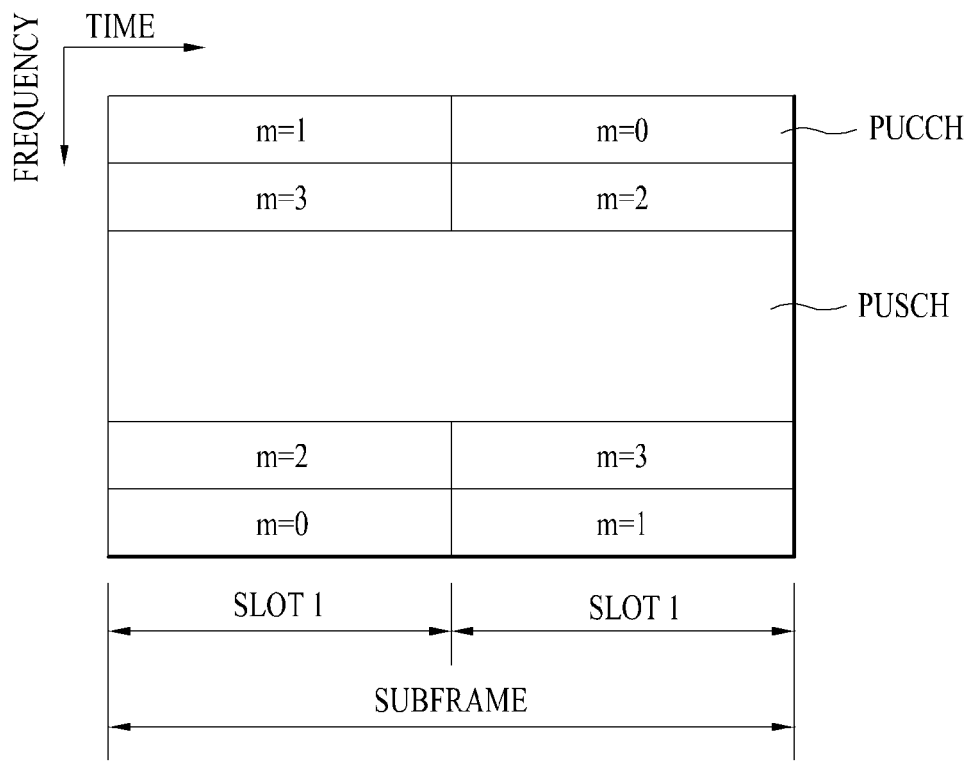
FIG. 6 is a diagram illustrating a structure of an UL subframe used in an LTE system.

FIG. 6 illustrates a structure of a UL subframe in the LTE system.

Referring to FIG. 6, a UL subframe may be divided into a control region and a data region. A Physical Uplink Control Channel (PUCCH) including Uplink Control Information (UCI) is allocated to the control region and a Physical uplink Shared Channel (PUSCH) including user data is allocated to the data region. The middle of the subframe is allocated to the PUSCH, while both sides of the data region in the frequency domain are allocated to the PUCCH. Control information transmitted on the PUCCH may include an HARQ ACK/NACK, a CQI representing a downlink channel state, an RI for Multiple Input Multiple Output (MIMO), a Scheduling Request (SR) requesting UL resource allocation. A PUCCH for one UE occupies one RB in each slot of a subframe. That is, the two RBs allocated to the PUCCH are frequency-hopped over the slot boundary of the subframe. Particularly, PUCCHs with m=0, m=1, and m=2 are allocated to a subframe in FIG. 6.

Now a description will be given of a MIMO system. MIMO can increase the transmission and reception efficiency of data by using a plurality of Transmission (Tx) antennas and a plurality of Reception (Rx) antennas. That is, with the use of multiple antennas at a transmitter or a receiver, MIMO can increase capacity and improve performance in a wireless communication system. The term "MIMO" is interchangeable with 'multi-antenna'.

The MIMO technology does not depend on a single antenna path to receive a whole message. Rather, it completes the message by combining data fragments received through a plurality of antennas. MIMO can increase data rate within a cell area of a predetermined size or extend system coverage at a given data rate. In addition, MIMO can find its use in a wide range including mobile terminals, relays, etc. MIMO can overcome a limited transmission capacity encountered with the conventional single-antenna technology in mobile communication.

Figure 7:
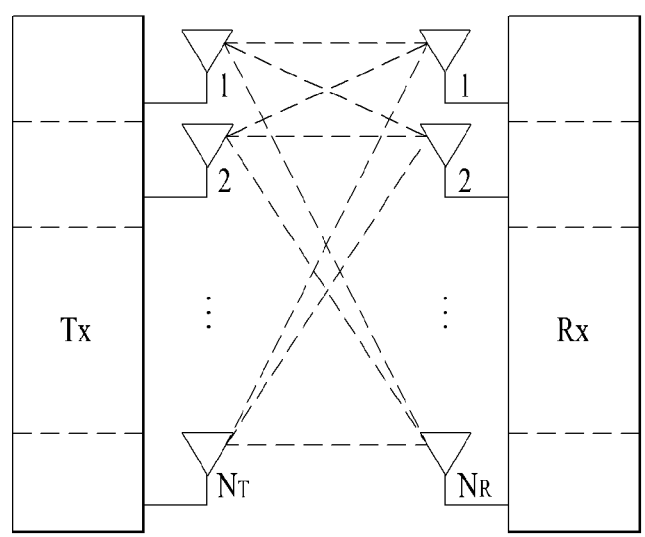
FIG. 7 is a diagram illustrating a configuration of a general MIMO communication system.

A configuration diagram of a general multi-antenna (MIMO) communication system is depicted in FIG. 7.

$N_T$ numbers of transmitting antennas are installed in a transmitting end and $N_R$ numbers of receiving antennas are installed in a receiving end. As described in the above, in case that both the transmitting end and the receiving end use plural number of antennas, a theoretical channel transmission capacity is increased compared to a case that the plural number of antennas are only used for either the transmitting end or the receiving end. The increase of the channel transmission capacity is proportional to the number of antenna. Thus, a transfer rate is enhanced and frequency efficiency is enhanced. If a maximum transfer rate is represented as Ro in case of using a single antenna, the transfer rate using multiple antennas can be theoretically increased as much as the maximum transfer rate Ro multiplied by a rate of increase Ri, as shown in the following Equation 1. In this case, the Ri is a smaller value of the NT and the NR.

$$R_i = \min(N_T, N_R) \qquad \text{[Equation 1]}$$

For instance, MIMO communication system using 4 transmitting antennas and 4 receiving antennas may be able to theoretically obtain the transfer rate of 4 times of a single antenna system. After the theoretical capacity increase of the multi-antenna system is proved in the mid-90s, various technologies for practically enhancing a data transmission rate have been actively studied up to date and several technologies among them are already reflected in such a various wireless communication standard as a 3rd generation mobile communication, a next generation wireless LAN and the like.

If we look at the research trend related to the multi-antenna until now, many active researches have been performed for such a study of various points of view as a study on information theory related to a multi-antenna communication capacity calculation in various channel environments and multiple access environment, a study on a radio channel measurement and model deduction of the multi-antenna system, a study on a space-time signal processing technology for enhancing a transmission reliability and a transmission rate, and the like.

In case of mathematically modeling a communication method of the multi-antenna system in order to explain it with more specific way, it can be represented as follows. As shown in FIG. 7, assume that there exist $N_T$ number of transmitting antennas and $N_R$ number of receiving antennas. First of all, if we look into a transmission signal, since the maximum number of information capable of being transmitted is $N_T$ in case that there exists $N_T$ number of transmitting antennas, transmission information can be represented as a vector in the following Equation 2.

$$s = [s_1, s_2, \ldots, s_{N_T}]^T \qquad \text{[Equation 2]}$$

Meanwhile, for each of the transmission informations $s_1, s_2, \ldots, s_{N_T}$, a transmit power may be differentiated according to the each of the transmission informations. In this case, if each of the transmit powers is represented as $P_1, P_2, \ldots, P_{N_T}$, transmit power-adjusted transmission information can be represented as a vector in the following Equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \qquad \text{[Equation 3]}$$

And, if ŝ is represented using a diagonal matrix P, it can be represented as a following Equation 4.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Equation 4]}$$

Meanwhile, let's consider a case that the $N_T$ number of transmission signal $x_1, x_2, \ldots, x_{N_T}$, which is practically transmitted, is configured in a manner of applying a weighted matrix W to the adjusted information vector ŝ. In this case, the weighted matrix performs a role of distributing the transmission information to each of the antennas according to the situation of the transmission channel and the like. The transmission signal $x_1, x_2, \ldots, x_{N_T}$ can be represented using a vector X in the following Equation 5. In this case, $W_{ij}$ means a weighting between an $i^{th}$ transmitting antenna and $j^{th}$ information. The W is called the weighted matrix or a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T1} & w_{N_T2} & \cdots & w_{N_TN_T} \end{bmatrix} \begin{bmatrix} \hat{s} \\ \hat{s} \\ \vdots \\ \hat{s} \\ \vdots \\ \hat{s} \end{bmatrix} = W\hat{s} = WPs \quad \text{[Equation 5]}$$

In general, a physical meaning of a rank of a channel matrix may indicate a maximum number capable of transmitting different information from each other in a given channel. Hence, since the rank of the channel matrix is defined by a minimum number of the numbers of row or column independent from each other, the rank of the matrix is configured not to be greater than the number of the row or the column. For instance, the rank of a channel matrix H (rank (H)) is limited as shown in Equation 6.

$$\text{rank}(H) \leq \min(N_T, N_R) \quad \text{[Equation 6]}$$

And, let's define each of the informations different from each other, which are transmitted using a multi-antenna technology, as a transport stream or simply a stream. The stream can be named a layer. Then, the number of the transport stream is naturally configured not to be greater than the rank of the channel, which is a maximum number capable of transmitting informations different from each other. Hence, the channel matrix H can be represented as Equation 7 in the following.

$$\text{\# of streams} \leq \text{rank}(H) \leq \min(N_T, N_R) \quad \text{[Equation 7]}$$

In this case, '# of streams' indicates the number of streams. Meanwhile, in this case, it should be cautious that one stream can be transmitted via more than one antenna.

Various methods making one or more streams correspond to many antennas may exist. These methods can be described in accordance with the kind of the multi-antenna technology in the following description. A case of transmitting one stream via many antennas may be called a space diversity scheme and a case of transmitting many streams via many antennas may be called a space multiplexing scheme. Naturally, a hybrid form of the space diversity and the space multiplexing is also available.

Meanwhile, it is expected that a LTE-A system, which is a standard of a next generation mobile communication system, will support a CoMP (coordinated multi point) transmission method, which is not supported by the conventional standard, to enhance a data transmission rate. In this case, the CoMP transmission method is a transmission method for two or more base stations or cells to communicate with the user equipment in a manner of cooperating with each other to enhance a communication performance between the user equipment situated at a radio shadow zone and the base station (a cell or a sector).

The CoMP transmission method can be classified into a joint processing (COMP joint processing, CoMP-JP) method in the form of a cooperative MIMO via data sharing and a coordinated scheduling/beamforming (CoMP-coordinated scheduling/beamforming, CoMP-CS/CB) method.

According to the joint processing (CoMP-JP) method in DL, a user equipment may be able to instantaneously receive data simultaneously from each of the base stations performing the CoMP transmission method. And, a reception performance can be enhanced in a manner of combining the signals received from each of the base stations (Joint Transmission (JT)). And, it is also possible to consider a method of transmitting a data to the user equipment on a specific timing by one of the base stations performing the CoMP transmission method (Dynamic Point Selection (DPS)).

On the other hand, according to the coordinated scheduling/beamforming method (CoMP-CS/CB), the user equipment may be able to instantaneously receive data from a single base station via a beamforming.

According to the joint processing (CoMP-JP) method in UL, each of the base stations may be able to simultaneously receive PUSCH signal from the user equipment (Joint Reception (JR)). On the other hand, according to the coordinated scheduling/beamforming method (CoMP-CS/CB), only a single base station may be able to receive the PUSCH. In this case, the decision to use the coordinated scheduling/beamforming method is determined by the coordinating cells (or base stations).

In the following description, channel state information (CSI) report is explained. In a current LTE standard, there exist two types of transmission scheme, i.e., an open-loop MIMO operated without channel information and a closed-loop MIMO operated based on channel information. In particular, in the closed loop MIMO, each of a user equipment and an eNode B can perform a beamforming based on the channel state information to obtain a multiplexing gain of MIMO antenna. The eNode B transmits a reference signal to the user equipment to obtain channel state information from the user equipment and then commands the user equipment to feedback the channel state information measured based on the reference signal on Physical Uplink Control Channel (PUCCH) or Physical Uplink Shared Channel (PUSCH).

The CSI is mainly classified into an RI (rank indicator), a PMI (precoding matrix index), and a CQI (channel quality indication). First of all, as mentioned in the foregoing description, the RI indicates rank information of a channel and means the number of stream capable of being received by a user equipment via an identical frequency-time resource. And, since the RI is determined by a long term fading of a channel, the RI is feedback to an eNode B with a longer interval compared to the PMI and CQI value in general.

Secondly, the PMI is a value reflecting a spatial characteristic of a channel and indicates a UE's preferred precoding matrix index of an eNode B on the basis of such a metric as SINR, and the like. Lastly, the CQI is a value indicating strength of a channel and means a reception SINR capable of being received in case that an eNode B uses the PMI in general.

An advanced system such as an LTE-A system considers additional multi-user diversity through multi-user MIMO (MU-MIMO). Due to interference between UEs multiplexed in an antenna domain in MU-MIMO, the accuracy of CSI may significantly affect interference with other multiplexed UEs as well as a UE that reports the CSI. Accordingly, more accurate CSI than in single-user MIMO (SU-MIMO) should be reported in MU-MIMO.

In this context, the LTE-A standard has determined to separately design a final PMI as a long-term and/or wideband PMI, W1, and a short-term and/or subband PMI, W2.

For example, a long-term covariance matrix of channels expressed as Equation 8 may be used for hierarchical codebook transformation that configures one final PMI with W1 and W2.

$$W = \text{norm}(W1 W2) \quad \text{[Equation 8]}$$

In Equation 8, W2 is a short-term PMI, which is a codeword of a codebook reflecting short-term channel information, W is a codeword of a final codebook, and norm(A) is a matrix obtained by normalizing each column of matrix A to 1.

Conventionally, the codewords W1 and W2 are given as Equation 9.

$$W1(i) = \begin{bmatrix} X_i & 0 \\ 0 & X_i \end{bmatrix}, \text{ where } X_i \text{ is } Nt/2 \text{ by } M \text{ matrix.} \quad \text{[Equation 9]}$$

$$W2(j) = \overbrace{\begin{bmatrix} e_M^k & e_M^l & & e_M^m \\ \alpha_j e_M^k & \beta_j e_M^l & \cdots & \gamma_j e_M^m \end{bmatrix}}^{r \text{ columns}}$$

(if rank = $r$), where $1 \le k, l, m \le M$ and $k, l, m$ are integer.

In Equation 9, the codewords are designed so as to reflect correlation characteristics between established channels, if cross-polarized antennas are densely arranged, for example, the distance between adjacent antennas is equal to or less than half a signal wavelength. The cross-polarized antennas may be divided into a horizontal antenna group and a vertical antenna group and the two antenna groups are co-located, each having the property of a uniform linear array (ULA) antenna.

Therefore, the correlations between antennas in each group have the same linear phase increment property and the correlation between the antenna groups is characterized by phase rotation. Since a codebook is quantized values of channels, it is necessary to design a codebook reflecting channel characteristics. For convenience of description, a rank-1 codeword designed in the above manner may be given as Equation 10.

$$W1(i) * W2(j) = \begin{bmatrix} X_i(k) \\ \alpha_j X_i(k) \end{bmatrix} \quad \text{[Equation 10]}$$

In Equation 10, a codeword is expressed as an $N_T \times 1$ vector where $N_T$ is the number of Tx antennas and the codeword is composed of an upper vector $X_i(k)$ and a lower vector $\alpha_j X_i(k)$, representing the correlation characteristics of the horizontal and vertical antenna groups, respectively. $X_i(k)$ is expressed as a vector having the linear phase increment property, reflecting the correlation characteristics between antennas in each antenna group. For example, a discrete Fourier transform (DFT) matrix may be used for $X_i(k)$.

An advanced system such as an LTE-A system considers achievement of an additional multi-user diversity by the use of MU-MIMO. Due to the existence of interference channels between UEs multiplexed in an antenna domain in MU-MIMO, the accuracy of CSI may significantly affect interference with other multiplexed UEs as well as a UE that reports the CSI. Accordingly, more accurate CSI than in SU-MIMO should be reported in MU-MIMO.

In CoMP JT, because a plurality of eNBs transmits the same data to a specific UE through cooperation, the eNBs may be theoretically regarded as forming a MIMO system with antennas distributed geographically. That is, even when MU-MIMO is implemented in JT, highly accurate CSI is required to avoid interference between CoMP-scheduled UEs as in a single cell MU-MIMO operation. The same applies to CoMP CB. That is, to avoid interference with a serving cell caused by a neighbor cell, accurate CSI is needed. In general, a UE needs to report an additional CSI feedback in order to increase the accuracy of CSI feedback. The CSI feedback is transmitted on a PUCCH or a PUSCH to an eNB.

In the following, a reference signal is explained in more detail.

In general, a reference signal, which is already known to both a transmitting end and a receiving end, is transmitted from the transmitting end to the receiving end together with data to measure a channel. The reference signal plays not only a role of measuring a channel but also a role of making a demodulation process to be performed in a manner of informing the receiving end of a modulation scheme. The reference signal is classified into a dedicated reference signal (DRS) used for an eNB and a specific user equipment (i.e., UE-specific reference signal) and a cell-specific reference signal used for all UEs in a cell (i.e., common reference signal or cell specific RS (CRS)). The cell-specific reference signal includes a reference signal used for reporting CQI/PMI/RI to an eNB in a manner of measuring CQI/PMI/RI in a user equipment. This sort of reference signal is called a CSI-RS (channel state information-RS).

Figure 8:
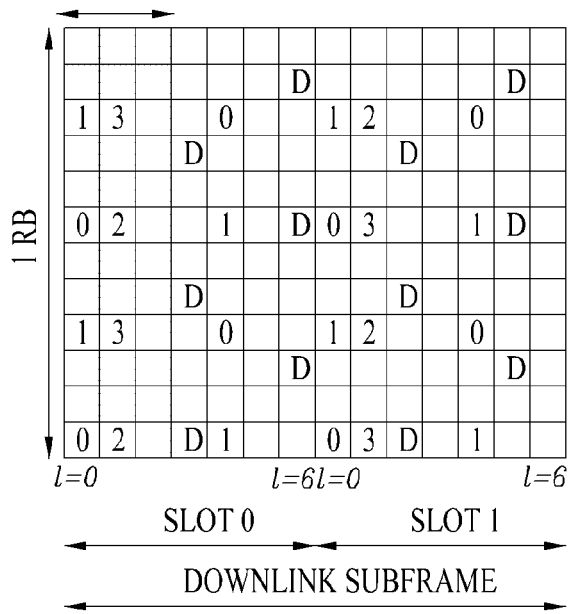
FIGS. 8 and 9 are diagrams for a structure of a DL reference signal in an LTE system supporting DL transmission using 4 antennas.
Figure 9:
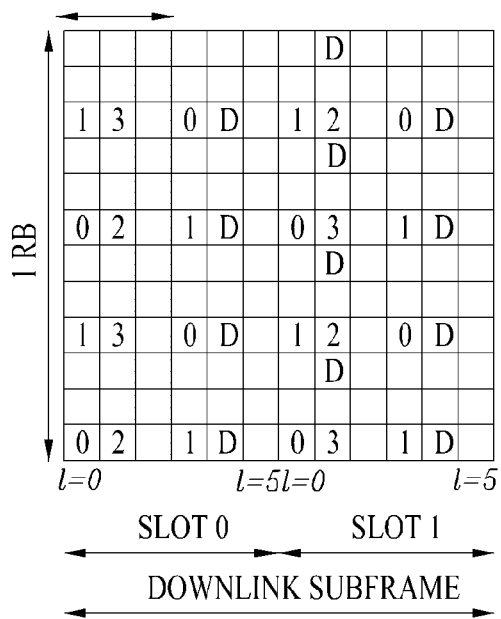

FIG. 8 and FIG. 9 are diagrams of a structure of a reference signal in LTE system supportive of downlink transmission using 4 antennas. In particular, FIG. 8 shows a case of a normal cyclic prefix and FIG. 9 shows a case of an extended cyclic prefix.

Referring to FIG. 8 and FIG. 9, 0 to 3 written on a grid may mean the CRS (common reference signal), which is a cell-specific reference signal, transmitted for the channel measurement and the data demodulation in a manner of corresponding to antenna port 0 to 3, respectively. The cell-specific reference signal CRS can be transmitted to a user equipment via the control information region as well as the data information region.

And, 'ID' written on the grid may mean a downlink DM-RS (demodulation RS), which is a user-specific RS. The DM-RS supports a single antenna port transmission via the data region, i.e., the PDSCH. The user equipment is signaled whether the DM-RS, which is the user equipment-specific RS, exists or not via an upper layer. FIG. 8 and FIG. 9 show an example of the DM-RS corresponding to an antenna port 5. The DM-RSs corresponding to an antenna port 7 to 14, i.e., total 8 antenna ports, are also defined by 3GPP standard document 36.211.

Figure 10:
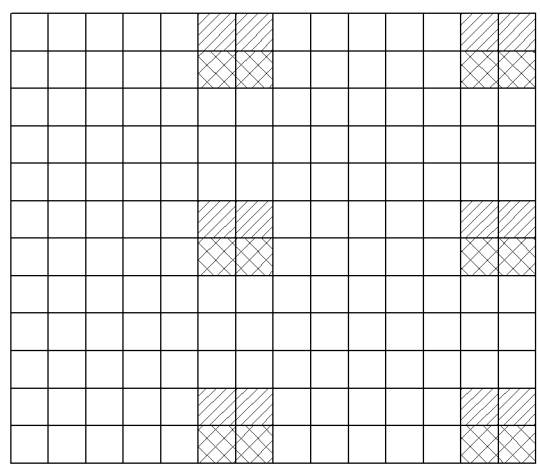
FIG. 10 is a diagram for an example of assigning a DL DM-RS defined in a current 3GPP standard document.

FIG. 10 illustrates an exemplary DL DMRS allocation defined in a current 3GPP standard specification.

Referring to FIG. 10, DMRSs for antenna ports 7, 8, 11, and 13 are mapped using sequences for the respective antenna ports in a first DMRS group (DMRS Group 1), whereas DMRSs for antenna ports 9, 10, 12, and 14 are mapped using sequences for the respective antenna ports in a second DMRS group (DMRS Group 2).

As compared to CRS, CSI-RS was proposed for channel measurement of a PDSCH and up to 32 different resource configurations are available for CSI-RS to reduce Inter-Cell Interference (ICI) in a multi-cellular environment.

A different CSI-RS (resource) configuration is used according to the number of antenna ports and adjacent cells transmit CSI-RSs according to different (resource) configurations, if possible. Unlike CRS, CSI-RS supports up to eight antenna ports and a total of eight antenna ports from antenna port 15 to antenna port 22 are allocated to CSI-RS in the 3GPP standard. [Table 1] and [Table 2] list CSI-RS configurations defined in the 3GPP standard. Specifically, [Table 1] lists CSI-RS configurations in the case of a normal CP and [Table 2] lists CSI-RS configurations in the case of an extended CP.

TABLE 1

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mods2 | (k', l') | $n_s$ mod2 | (k', l') | $n_s$ mod2 |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| Frame structure type 2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

TABLE 2

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod2 | (k', l') | $n_s$ mod2 | (k', l') | $n_s$ mod2 |
| Frame structure type 1 and 2 | 0 | (11, 4) | 0 | (11, 4) | 0 | (11, 4) | 0 |
| | 1 | (9, 4) | 0 | (9, 4) | 0 | (9, 4) | 0 |
| | 2 | (10, 4) | 1 | (10, 4) | 1 | (10, 4) | 1 |
| | 3 | (9, 4) | 1 | (9, 4) | 1 | (9, 4) | 1 |
| | 4 | (5, 4) | 0 | (5, 4) | 0 | | |
| | 5 | (3, 4) | 0 | (3, 4) | 0 | | |
| | 6 | (4, 4) | 1 | (4, 4) | 1 | | |
| | 7 | (3, 4) | 1 | (3, 4) | 1 | | |
| | 8 | (8, 4) | 0 | | | | |
| | 9 | (6, 4) | 0 | | | | |
| | 10 | (2, 4) | 0 | | | | |
| | 11 | (0, 4) | 0 | | | | |
| | 12 | (7, 4) | 1 | | | | |
| | 13 | (6, 4) | 1 | | | | |
| | 14 | (1, 4) | 1 | | | | |
| | 15 | (0, 4) | 1 | | | | |

TABLE 2-continued

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod2 | (k', l') | $n_s$ mod2 | (k', l') | $n_s$ mod2 |
| Frame structure type 2 only | 16 | (11, 1) | 1 | (11, 1) | 1 | (11, 1) | 1 |
| | 17 | (10, 1) | 1 | (10, 1) | 1 | (10, 1) | 1 |
| | 18 | (9, 1) | 1 | (9, 1) | 1 | (9, 1) | 1 |
| | 19 | (5, 1) | 1 | (5, 1) | 1 | | |
| | 20 | (4, 1) | 1 | (4, 1) | 1 | | |
| | 21 | (3, 1) | 1 | (3, 1) | 1 | | |
| | 22 | (8, 1) | 1 | | | | |
| | 23 | (7, 1) | 1 | | | | |
| | 24 | (6, 1) | 1 | | | | |
| | 25 | (2, 1) | 1 | | | | |
| | 26 | (1, 1) | 1 | | | | |
| | 27 | (0, 1) | 1 | | | | |

Figure 11:
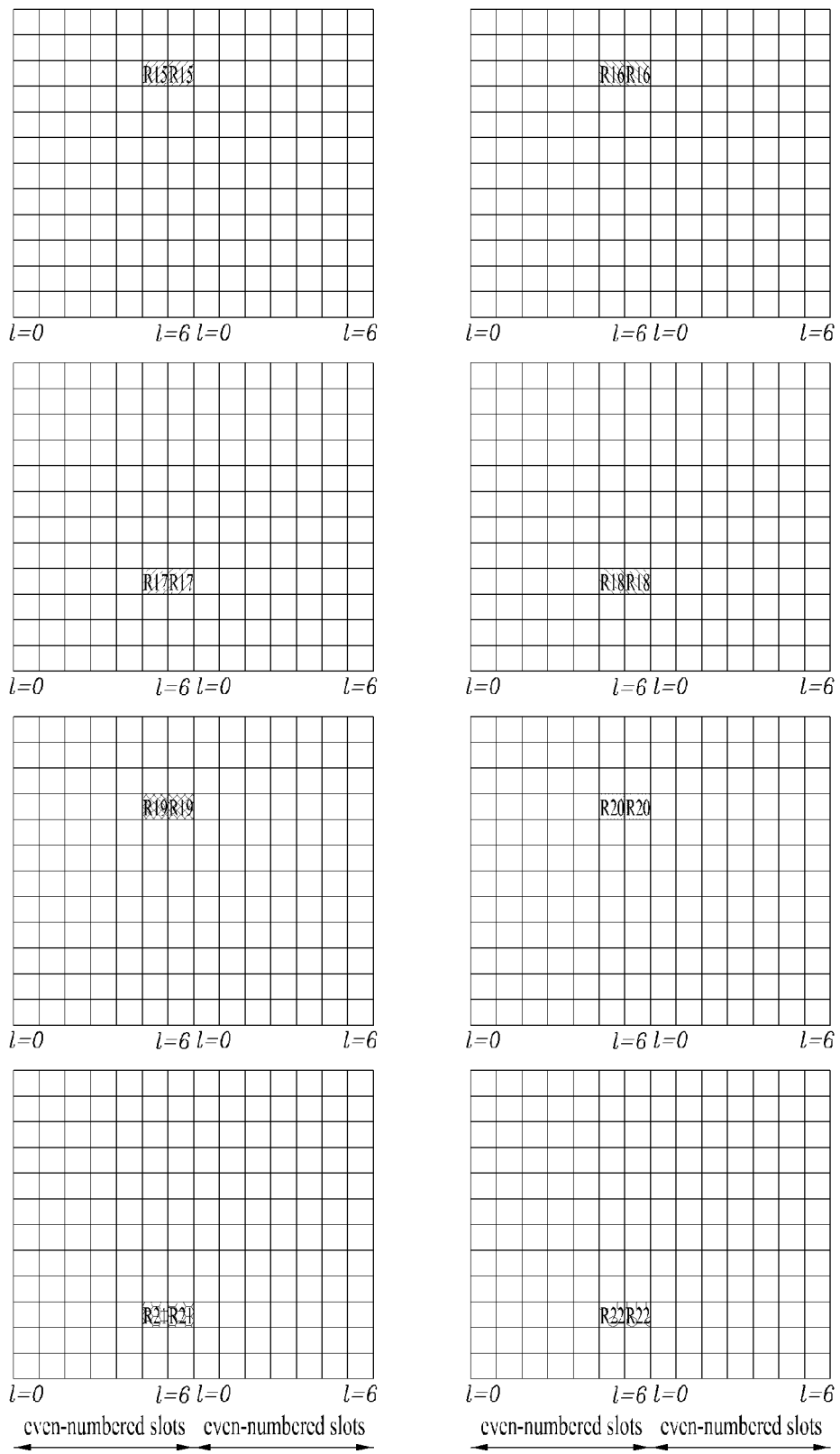
FIG. 11 is a diagram for a CSI-RS configuration #0 among DL CSI-RS configurations defined in a current 3GPP standard document in case of a normal CP.

In [Table 1] and [Table 2], represents an RE index where is a subcarrier index and is an OFDM symbol index. FIG. 11 illustrates CSI-RS configuration #0 of DL CSI-RS configurations defined in the current 3GPP standard.

In addition, CSI-RS subframe configurations may be defined, each by a periodicity in subframes, and a subframe offset. [Table 3] lists CSI-RS subframe configurations defined in the 3GPP standard.

TABLE 3

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$ - 5 |
| 15-34 | 20 | $I_{CSI-RS}$ - 15 |
| 35-74 | 40 | $I_{CSI-RS}$ - 35 |
| 75-154 | 80 | $I_{CSI-RS}$ - 75 |

Information about a Zero Power (ZP) CSI-RS is transmitted in a CSI-RS-Config-r10 message configured as illustrated in [Table 4] by RRC layer signaling. Particularly, a ZP CSI-RS resource configuration includes zeroTxPowerSubframeConfig-r10 and a 16-bit bitmap, zeroTxPowerResourceConfigList-r10. zeroTxPowerSubframeConfig-r10 indicates the CS-RS transmission periodicity and subframe offset of a ZP CSI-RS by illustrated in [Table 3]. zeroTxPowerResourceConfigList-r10 indicates a ZP CSI-RS configuration. The elements of this bitmap indicate the respective configurations written in the columns for four CSI-RS antenna ports in [Table 1] or [Table 2]. That is, the current 3GPP standard defines a ZP CSI-RS only for four CSI-RS antenna ports.

TABLE 4

```
-- ASN1START
CSI-RS-Config-r10 ::=    SEQUENCE {
    csi-RS-r10           CHOICE {
    ...
    }
    zeroTxPowerCSI-RS-r10  CHOICE {
        release              NULL,
        setup                SEQUENCE {
```

TABLE 4-continued

```
            zeroTxPowerResourceConfigList-r10   BIT STRING (SIZE 16))
            zeroTxPowerSubframeConfig-r10       INTEGER (0..154)
        }
    }
}
-- ASN1STOP
```

The current 3GPP standard defines modulation orders and cording rates for respective CQI indexes as illustrated in [Table 5].

TABLE 5

| CQI index | modulation | code rate × 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

A CQI is calculated based on interference measurement as follows.

A UE needs to measure a Signal to Interference and Noise Ratio (SINR) for CQI calculation. In this case, the UE may measure the reception power (S-measure) of a desired signal in an RS such as a Non-Zero Power (NZP) CSI-RS. For interference power measurement (I-measure or Interference Measurement (IM)), the UE measures the power of an interference signal resulting from eliminating the desired signal from a received signal.

CSI measurement subframe sets and may be configured by higher-layer signaling and the subframes of each subframe set are different from the subframes of the other subframe set. In this case, the UE may perform S-measure in an RS such as a CSI-RS without any specific subframe constraint. However, the UE should calculate CQIs separately for the CSI measurement subframe sets and through separate I-measures in the CSI measurement subframe sets and.

Hereinbelow, transmission modes for a DL data channel will be described.

A current 3GPP LTE standard specification, 3GPP TS 36.213 defines DL data channel transmission modes as illustrated in [Table 6] and [Table 7]. A DL data channel transmission mode is indicated to a UE by higher-layer signaling, that is, RRC signaling.

TABLE 6

| Transmission mode | DCI format | Transmission scheme of PDSCH corresponding to PDCCH |
|---|---|---|
| Mode 1 | DCI format 1A | Single-antenna port, port 0 |
|  | DCI format 1 | Single-antenna port, port 0 |
| Mode 2 | DCI format 1A | Transmit diversity |
|  | DCI format 1 | Transmit diversity |
| Mode 3 | DCI format 1A | Transmit diversity |
|  | DCI format 2A | Large delay CDD or Transmit diversity |
| Mode 4 | DCI format 1A | Transmit diversity |
|  | DCI format 2 | Closed-loop spatial multiplexing or Transmit diversity |
| Mode 5 | DCI format 1A | Transmit diversity |
|  | DCI format 1D | Multi-user MIMO |
| Mode 6 | DCI format 1A | Transmit diversity |
|  | DCI format 1B | Closed-loop spatial multiplexing using a single transmission layer |
| Mode 7 | DCI format 1A | If the number of PBCH antenna ports is one, Single-antenna port, port 0 is used, otherwise Transmit diversity |
|  | DCI format 1 | Single-antenna port, port 5 |
| Mode 8 | DCI format 1A | If the number of PBCH antenna ports is one, Single-antenna port, port 0 is used, otherwise Transmit diversity |
|  | DCI format 2B | Dual layer transmission, port 7 and 8 or Single-antenna port, port 7 or 8 |
| Mode 9 | DCI format 1A | Non-MBSFN subframe: If the number of PBCH antenna ports is one, Single-antenna port, port 0 is used, otherwise Transmit diversity MBSFN subframe: Single-antenna port, port 7 |
|  | DCI format 2C | Up to 8 layer transmission, ports 7-14 or single-antenna port, port 7 or 8 |
| Mode 10 | DCI format 1A | Non-MBSFN subframe: If the number of PBCH antenna ports is one, Single-antenna port, port 0 is used, otherwise Transmit diversity MBSFN subframe: Single-antenna port, port 7 |
|  | DCI format 2D | Up to 8 layer transmission, ports 7-14 or single-antenna port, port 7 or 8 |

TABLE 7

| Transmission mode | DCI format | Transmission scheme of PDSCH corresponding to PDCCH |
|---|---|---|
| Mode 1 | DCI format 1A | Single-antenna port, port 0 |
|  | DCI format 1 | Single-antenna port, port 0 |
| Mode 2 | DCI format 1A | Transmit diversity |
|  | DCI format 1 | Transmit diversity |
| Mode 3 | DCI format 1A | Transmit diversity |
|  | DCI format 2A | Transmit diversity |
| Mode 4 | DCI format 1A | Transmit diversity |
|  | DCI format 2 | Transmit diversity |
| Mode 5 | DCI format 1A | Transmit diversity |
| Mode 6 | DCI format 1A | Transmit diversity |
| Mode 7 | DCI format 1A | Single-antenna port, port 5 |
|  | DCI format 1 | Single-antenna port, port 5 |
| Mode 8 | DCI format 1A | Single-antenna port, port 7 |
|  | DCI format 2B | Single-antenna port, port 7 or 8 |
| Mode 9 | DCI format 1A | Single-antenna port, port 7 |
|  | DCI format 2C | Single-antenna port, port 7 or 8, |
| Mode 10 | DCI format 1A | Single-antenna port, port 7 |
|  | DCI format 2D | Single-antenna port, port 7 or 8, |

Referring to Table 6 and Table 7, in a current 3GPP LTE standard document, downlink control information (DCI) formats are defined according to a type of RNTI masked on PDCCH. In particular, in case of a C-RNTI and an SPS C-RNTI, the current 3GPP LTE standard document shows a transmission mode and a DCI format corresponding to the transmission mode, i.e., a transmission mode-based DCI format. And, a DCI format 1A for a Fall-back mode, which is applicable irrespective of a transmission mode, is defined in the current 3GPP LTE standard document. Table 6 shows an example that the type of RNTI masked on PDCCH corresponds to C-RNTI and Table 7 shows an example that the type of RNTI masked on PDCCH corresponds to SPS C-RNTI.

As an operation example of a transmission mode, if a user equipment performs blind decoding on PDCCH masked with C-RNTI shown in Table 6 and a DCI format 1B is detected as a result of the blind decoding, PDSCH is decoded under an assumption that PDSCH is transmitted using a closed loop spatial multiplexing scheme using a single layer.

In Table 6 and 7, a transmission mode 10 may indicate a downlink data channel transmission mode of the aforementioned CoMP transmission scheme. For instance, if a user equipment performs blind decoding on PDCCH masked with C-RNTI shown in Table 6 and a DCI format 2D is detected as a result of the blind decoding, PDSCH is decoded under an assumption that PDSCH is transmitted using a multi-layer transmission scheme based on an antenna port 7 to 14, i.e., DM-RS. Or, PDSCH is decoded under an assumption that PDSCH is transmitted using a single antenna transmission scheme based on a DM-RS antenna port 7 or 8.

On the contrary, if a user equipment performs blind decoding on PDCCH masked with C-RNTI and a DCI format 1A is detected as a result of the blind decoding, a transmission mode varies according to whether a subframe corresponds to an MBSFN subframe. For instance, if the subframe corresponds to a non-MBSFN subframe, PDSCH is decoded under an assumption that PDSCH is transmitted using a single antenna transmission scheme based on a CRS of an antenna port 0 or PDSCH is transmitted using a transmit diversity scheme based on a CRS. If the subframe corresponds to a MBSFN subframe, PDSCH can be decoded under an assumption that PDSCH is transmitted using a single antenna transmission scheme based on a DM-RS of an antenna port 7.

In the following, QCL (Quansi Co-Location) between antenna ports is explained.

QCL between antenna ports means that some or all of large-scale properties of a signal (or a radio channel corresponding to an antenna port) received from a single antenna port by a user equipment are identical to large-scale properties of a signal (or a radio channel corresponding to an antenna port) received from a different single antenna port. In this case, the large-scale properties include Doppler spread related to a frequency offset, Doppler shift, average delay related a timing offset, delay spread and the like. Moreover, the large-scale properties may include an average gain as well.

According to the aforementioned definition, a user equipment is unable to assume that the large-scale properties are identical to each other between non-QCL antenna ports, i.e., between NQCL (Non Quansi Co-Located)) antenna ports. In this case, a user equipment should independently perform a tracking procedure to obtain a frequency offset, a timing offset and the like according to an antenna port.

On the contrary, there is a merit in that a user equipment can perform following operations between QCL antenna ports.

1) A user equipment can identically apply a power-delay profile for a radio channel corresponding to a specific antenna port, delay spread, Doppler spectrum and a Doppler spread estimation result to a Wiener filter parameter and the like, which are used in case of estimating a radio channel corresponding to a different antenna port.

2) And, after time synchronization and frequency synchronization for the specific antenna port are obtained, a user equipment can apply identical synchronization to a different antenna port.

3) Lastly, regarding an average gain, a user equipment can average RSRP (reference signal received power) measurement values measured for each of QCL antenna ports.

For instance, if a user equipment receives DMRS-based downlink data channel scheduling information, e.g., a DCI format 2C, via PDCCH (or E-PDCCH), it is assumed that the user equipment performs channel estimation for PDSCH via a DM-RS sequence indicated by the scheduling information and performs data demodulation.

In this case, if a DM-RS antenna port used for a user equipment to demodulate a downlink data channel is Quansi co-located (QCL) with a CRS antenna port of a serving cell, the user equipment applies large-scale properties of a radio channel estimated via a CRS antenna port of the user equipment as it is in case of estimating a channel via the DM-RS antenna port. By doing so, it is able to enhance reception performance of a DMRS-based downlink data channel.

Similarly, if a DM-RS antenna port used for a user equipment to demodulate a downlink data channel is Quansi co-located (QCL) with a CSI-RS antenna port of a serving cell, the user equipment applies large-scale properties of a radio channel estimated via the CSI-RS antenna port of the serving cell as it is in case of estimating a channel via the DM-RS antenna port. By doing so, it is able to enhance reception performance of a DMRS-based downlink data channel.

Meanwhile, when a downlink signal is transmitted using a transmission mode 10 corresponding to a CoMP mode, LTE system defines that a base station sets one of a QCL type A and a QCL type B to a user equipment via a higher layer signal.

In this case, the QCL type A assumes that large-scale properties except an average gain of an antenna port of a CRS, a DM-RS and a CSI-RS is QCL (Quasi co-located). It means that a physical channel and signals are transmitted in a same node (point). On the contrary, the QCL type B defines that each user equipment sets maximum 4 QCL modes via a higher layer message to make such CoMP transmission as DPS, JT and the like to be transmitted and dynamically sets a QCL mode for receiving a downlink signal among the maximum 4 QCL modes through DCI (downlink control information).

When the QCL type B is set, DPS transmission is explained in more tail.

First of all, assume that a node #1 including N1 number of antenna ports transmits a CSI-RS resource #1 and a node #2 including N2 number of antenna ports transmits a CSI-RS resource #2. In this case, the CSI-RS resource #1 is included in a QCL mode parameter set #1 and the CSI-RS resource #2 is included in a QCL mode parameter set #2. Moreover, a base station sets a parameter set #1 and a parameter set #2 to a UE existing in common coverage of the node #1 and the node #2 via a higher layer signal.

Subsequently, when data (i.e., PDSCH) is transmitted through the node #1, the base station sets the parameter #1 to the user equipment using DCI. When data is transmitted through the node #2, the base station sets the parameter #2 to the user equipment. By doing so, the DPS transmission can be performed. In terms of the user equipment, if the parameter set #1 is set to the user equipment via the DCI, the user equipment can assume that the CSI-RS resource #1 and a DM-RS are Quasi co-located. If the parameter set #2 is set to the user equipment, the user equipment can assume that the CSI-RS resource #2 and a DM-RS are Quasi co-located.

In the following, an active antenna system (AAS) and 3 dimensional beamforming are explained.

According to a legacy cellular system, a base station reduces inter-cell interference and uses a method of enhancing throughput of user equipments in a cell (e.g., SINR (signal to interference plus noise ratio)) using a mechanical tilting or an electrical tilting. Regarding this, it shall be explained in more detail with reference to a drawing.

Figure 12:
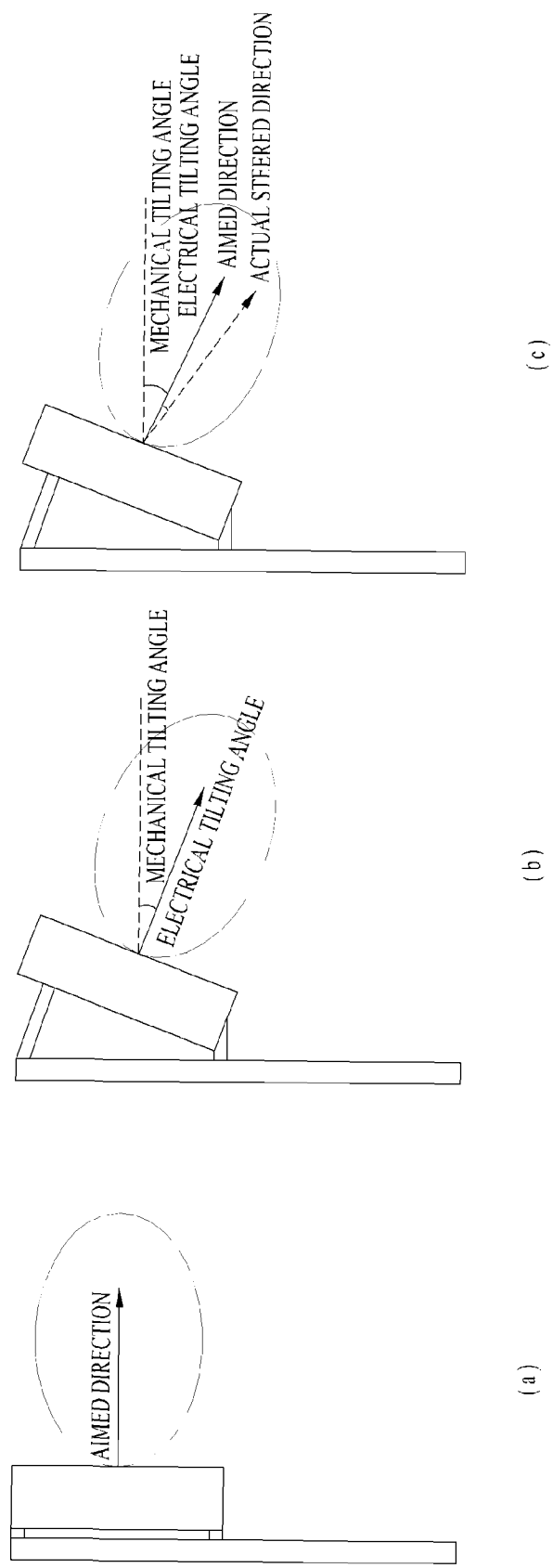
FIG. 12 is a diagram for explaining an antenna titling scheme.

FIG. 12 is a diagram for explaining an antenna titling scheme. In particular, FIG. 12 (a) shows an antenna structure to which an antenna tilting is not applied, FIG. 12 (b) shows an antenna structure to which a mechanical tilting is applied and FIG. 12 (c) shows an antenna structure to which both the mechanical tilting and the electrical tilting are applied.

When FIG. 12 (a) and FIG. 12 (b) are compared with each other, in case of the mechanical tilting, as shown in FIG. 12 (b), there is a demerit in that a beam direction is fixed when the mechanical titling is initially installed. Moreover, in case of the electrical titling, as shown in FIG. 12 (c), although a tilting angle is modifiable using an internal phase shift module, there in a demerit in that it is able to perform very limitative vertical beamforming (vertical beamforming) only due to an actual cell-fixed tilting.

Figure 13:
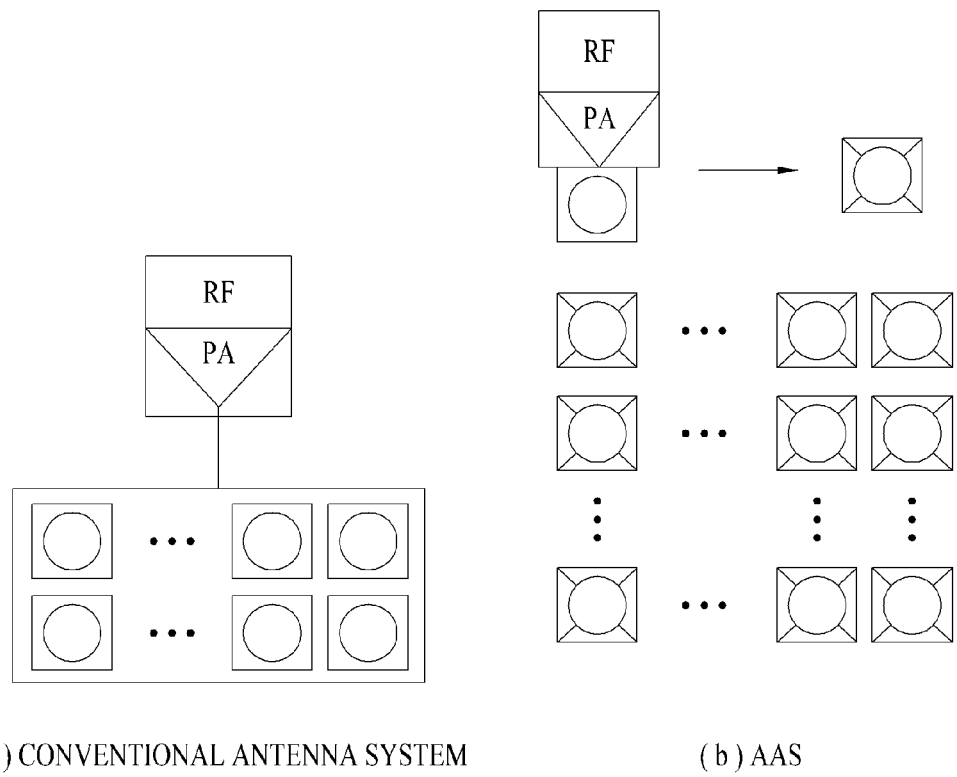
FIG. 13 is a diagram for comparing a conventional antenna system and an active antenna system with each other.

FIG. 13 is a diagram for comparing a conventional antenna system and an active antenna system (AAS) with each other. In particular, FIG. 13 (a) shows the conventional antenna system and FIG. 13 (b) shows the active antenna system.

Referring to FIG. 13, unlike a conventional antenna system, an active antenna system corresponds to a system that each of a plurality of antenna modules includes a power amplifier and an RF module, i.e., an active element. Hence, the active antenna system can control power and a phase of each of a plurality of the antenna modules.

In general, a MIMO antenna structure considers a linear, i.e., one dimensional array antenna. In one dimensional array structure, a beam capable of being generated by beamforming exists in a two-dimensional plane. This can also be applied to a passive antenna system (PAS)-based MIMO structure of a legacy base station. Although vertical antennas and horizontal antennas exist in a PAS-based base station, since the vertical antennas are bound by a single RF module, it is difficult to perform beamforming in vertical direction. Hence, it is able to apply the aforementioned mechanical tilting only.

Yet, as an antenna structure of a base station is evolved to an active antenna system, an independent RF module is also implemented in vertical direction antennas. Hence, beamforming is enabled not only in horizontal direction but also in vertical direction. This is called elevation beamforming.

According to the elevation beamforming, since beams capable of being generated are able to be represented in a 3 dimensional space in vertical and horizontal direction, this is also called 3 dimensional beamforming. In particular, the 3 dimensional beamforming is enabled in a manner that one dimensional array antenna structure is evolved to a two dimensional array antenna structure of a plane form. In this case, the 3 dimensional beamforming can be performed not only in a planar form of an antenna array but also in an array structure of a ring form. The 3 dimensional beamforming has a characteristic in that a MIMO process is performed in a 3 dimensional space due to an antenna arrangement of various forms instead of a conventional 1 dimensional array antenna structure.

Figure 14:
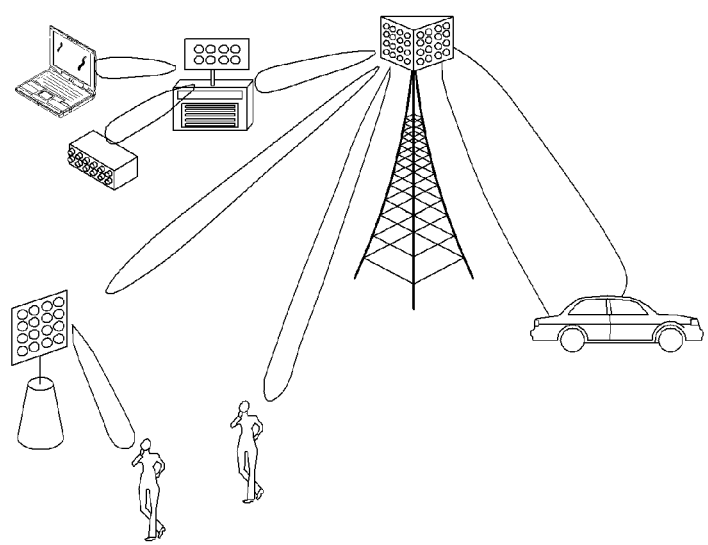
FIG. 14 is a diagram for an example of forming a UE-specific beam based on an active antenna system.

FIG. 14 is a diagram for an example of forming a UE-specific beam based on an active antenna system. Referring to FIG. 14, with the help of 3 dimensional beamforming, although a user equipment moves back and forth of a base station and left and right of the base station, it is able to perform beamforming. Hence, it is able to more freely form a UE-specific beam.

Moreover, transmission environment using an antenna structure of a two dimensional array based on an active antenna may include environment of transmitting to an outdoor UE by an outdoor base station, environment (O2I, outdoor to indoor) of transmitting to an indoor UE by an outdoor base station and environment (indoor hotspot) of transmitting to indoor UE by an indoor base station and the like.

Figure 15:
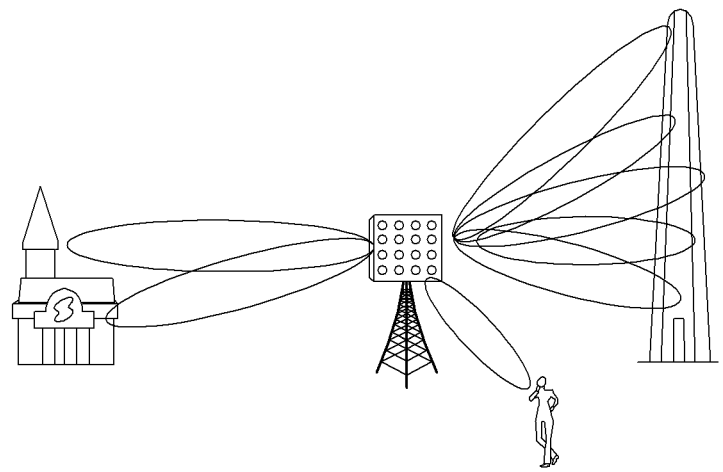
FIG. 15 is a diagram for a two dimensional beam transmission scenario based on an active antenna system.

FIG. 15 is a diagram for a two dimensional beam transmission scenario based on an active antenna system.

Referring to FIG. 15, in case of assuming an actual cell environment including a plurality of various buildings, it is necessary for a base station to consider not only capability of controlling a UE-specific horizontal beam but also capability of controlling a vertical beam in consideration of various UE heights according to various building heights. In case of considering the cell environment, it is necessary to reflect a channel property significantly different from a legacy radio channel environment, e.g., shadow/path loss change according to a height difference, fading characteristic change and the like.

In other word, 3 dimensional beamforming is an evolved beamforming of horizontal beamforming, which is used to be performed in horizontal direction only based on a conventional linear one dimensional array antenna structure. In particular, the 3 dimensional beamforming corresponds to a MIMO processing scheme, which is performed in a form extended and combined to elevation beamforming or vertical beamforming based on multi-dimensional array antenna structure such as a planar array and the like.

In the following, a MIMO system using linear precoding is explained. In a frequency unit (e.g., subcarrier unit) capable of assuming that flat fading is experienced at a frequency side in a narrow band system or a wideband system, modeling can be performed for a downlink MIMO system as shown in Equation 11 in the following.

$$y = Hx + z \quad \text{[Equation 11]}$$

If it is assumed that the number of receiving antenna port of a user equipment corresponds to $N_r$ and the number of transmitting antenna ports of a base station corresponds to $N_t$, in Equation 11, y corresponds to a reception signal vector of $N_r \times 1$ received by the $N_r$ number of receiving antennas of the user equipment, H corresponds to MIMO channel matrix of $N_r \times N_t$ size, x corresponds to a reception signal of $N_t \times 1$ size, and z corresponds to reception noise of $N_r \times 1$ size and an interference vector.

The aforementioned system model can be applied not only to a single UE transmission scenario (single user MIMO) but also to a multi-UE transmission scenario (multi-user MIMO). In the former case, $N_r$ corresponds to the number of receiving antennas of a single UE. Yet, in the latter case, $N_r$ corresponds to the total number of receiving antennas of multiple UEs in a broad sense.

The aforementioned system model can be applied not only to a downlink transmission scenario but also to an uplink transmission scenario. In this case, $N_t$ may indicate the number of transmitting antennas of a UE and $N_r$ may indicate the number of receiving antennas of a base station.

In case of considering a linear MIMO precoder, the MIMO precoder can be represented by a matrix U of $N_t \times N_s$ size in general. In this case, $N_s$ corresponds to the number of transmission rank or the number of transmission layer. Hence, modeling can be performed on a transmission signal vector x as shown in Equation 12 in the following.

$$x = \sqrt{\frac{P_T}{N_s}} Us \quad \text{[Equation 12]}$$

In Equation 12, $P_T$ corresponds to a transmission signal energy and s corresponds to a transmission signal vector of $N_s \times 1$ size corresponding to signals transmitted from the $N_s$ number of transmission layers. In particular, it may be able to represent as $E\{s^H U^H U s\} = N_s$. If a precoding vector of $N_t \times 1$ size, which corresponds to each transmission layer of the $N_s$ number of transmission layers, corresponds to $u_1, \ldots, u_{N_s}$, it may be able to represent as $U = [u_1, \ldots, u_{N_s}]$. In this case, the Equation 12 mentioned above can also be represented as Equation 13 in the following.

$$x = \sqrt{\frac{P_T}{N_s}} \sum_{i=1}^{N_s} u_i s_i \quad \text{[Equation 13]}$$

In the Equation 13, $s_i$ corresponds to an $i^{th}$ element of a vector s. In general, it may assume that signals transmitted from layers different from each other are uncorrelated ($E\{s_j^* s_i\} = 0 \ \forall \ i \neq j$) and average size of each signal is identical to each other. For clarity, if average energy of each signal corresponds to 1 ($E\{|s_i|^2\} = 1 \ \forall \ i$), the sum of energy of each layer precoding vector corresponds to $N_s$ as shown in Equation 14 in the following.

$$\sum_{i=1}^{N_s} E\{u_i^H u_i\} = N_s \quad \text{[Equation 14]}$$

In Equation 14, when a signal is transmitted using identical power via each layer, it is able to know that $E\{u_i^H u_i\} = 1$ works.

Meanwhile, such a multi antenna system as the aforementioned massive MIMO system is going to be repeatedly evolved and it is highly probable to increase the number of antennas in the future. Practically, LTE standard considers maximum 64 base station transmitting antennas in consideration of 3D MIMO environment.

Yet, as the number of antennas increases, pilot and feedback overhead are increase and complexity is also increases. If the number of antennas of a base station increases, a size of MIMO channel H becomes large. Hence, it is also necessary to increase the number of pilots for measuring transmitted by a base station to enable a user equipment to estimate the MIMO channel. And, when feedback is sent to make the base station know explicit or implicit information on the MIMO channel measured by the user equipment, if channel matrix becomes large, an amount of the feedback is also increasing. In particular, in case of performing codebook-based PMI feedback transmission like LTE system does, a size of a PMI codebook is exponentially increasing according to the increase of the number of antennas and calculation complexity of the base station and the user equipment is increased as well.

Under this environment, if pilot transmission is performed in a sub-array unit in a manner of partitioning the total transmitting antennas or feedback is performed in a sub-array unit, it is able to reduce system complexity and overhead. In particular, in terms of LTE technology standard, it is able to support the massive MIMO system in a manner of reusing most part of a legacy pilot supporting up to 8 transmission antennas, a MIMO precoding scheme and/or a feedback system.

In this aspect, if each layer precoding vector in the MIMO system model is partitioned into the M number of random sub-precoding vectors and a sub-precoding vector corresponding to a precoding vector of an $i^{th}$ layer is represented as $u_{i,1}, \ldots, u_{i,M}$, the precoding vector of the $i^{th}$ layer can be represented as $u_i = [u_{i,1}^T u_{i,2}^T \ldots u_{i,M}^T]^T$.

In this case, each sub-precoding vector experiences each sub-channel matrix, which is separated from a MIMO channel H of $N_r \times N_t$ size as many as the number of transmitting antennas of each partition in row direction, as a valid channel. In this case, the MIMO channel H represented by sub-channel matrixes can be represented as Equation 15 in the following.

$$H = [H_1 \ldots H_M]$$ [Equation 15]

If each sub-precoding vector preferred by a user equipment is determined based on a PMI codebook, it is necessary to have a process of normalizing each sub-precoding vector. In this case, the normalizing process is a common name for all processes which are performed to appropriately select a precoding vector or a value, a size and/or a phase of a specific element of a vector from a PMI codebook to make a sub-precoding vector of an identical size to be selected from the PMI codebook for the identical number of transmitting antennas.

For instance, if a first element of a PMI codebook consists of 0 or 1, a phase and a size of each sub-precoding vector can be normalized in accordance with the first element of the PMI codebook. In the following, assume that a sub-precoding vector $u_{i,m}$ corresponding to an $m^{th}$ partition is normalized by $\alpha_{i,m}$ value and a normalized sub-precoding vector (normalized partitioned precoder, NPP) corresponds to $v_{i,m} = u_{i,m}/\alpha_{i,m}$. Hence, when a codebook-based precoding is considered, a partitioned precoding can be modeled as shown in Equation 16 in the following.

$$u_i = [\alpha_{i,1} v_{i,1}^T \alpha_{i,2} v_{i,2}^T \ldots \alpha_{i,M} v_{i,M}^T]^T$$ [Equation 16]

As shown in the aforementioned Equation 16, in the aspect of total precoders, each $\alpha_{i,m}$ can be interpreted as a value for coupling each NPP with each other. In the following, this value is called a linking coefficient. Consequently, if a precoding scheme is normalized for each partitioned antenna port and linking coefficients capable of coupling each normalized precoder are normalized, a precoding scheme for total transmitting antenna (port) can be normalized.

Such a vector form as $a_i = [\alpha_{i,1} \alpha_{i,2} \ldots \alpha_{i,M}]^T$ can be defined in a manner of collecting the M number of linking coefficients for an $i^{th}$ layer. In the following, $a_i$ is called 'coupling vector'.

Although it is represented as a coupling vector consists of the M number of values, $b_i$, which is normalized by a first element of the coupling vector and is represented by the M−1 number of remaining values, can be regarded as a coupling vector. In particular, a relative difference value of the M−1 number of remaining NPPs on the basis of a first NPP can be defined as a coupling vector as shown in Equation 17 in the following. This is because a first element is assumed to be already normalized in the aspect of the total precoding vector $u_i$.

$$\frac{a_i}{\alpha_{i,1}} = \left[1 \; \frac{\alpha_{i,2}}{\alpha_{i,1}} \; \frac{\alpha_{i,3}}{\alpha_{i,1}} \ldots \frac{\alpha_{i,M}}{\alpha_{i,1}}\right]^T = [1 \, b_i^T]^T$$ [Equation 17]

If each transmission layer performs partitioning of an identical number, it is also able to define a linking matrix shown in Equation 18 in the following. And, an NPP of a matrix form for each partition can also be defined as Equation 19 in the following.

$$A = [a_1 \ldots a_{N_s}]$$ [Equation 18]

$$V_m = [v_{1,m} \ldots v_{N_s,m}], m = 1, \ldots, M$$ [Equation 19]

Assume that a vector of which each element of a coupling vector of M×1 size is repeated as much as a size of each partition corresponds to an extended coupling vector $\hat{a}_i$. For example, when M corresponds to 2 for an $i^{th}$ layer, a size of a first partition corresponds to 3 and a size of a second partition corresponds to 4, it may be able represent as $\hat{a}_i = [\alpha_{i,1} \alpha_{i,1} \alpha_{i,1} \alpha_{i,2} \alpha_{i,2} \alpha_{i,2} \alpha_{i,2}]^T$. It is able to define such an extended linking matrix as $\hat{A} = [\hat{a}_1 \ldots \hat{a}_{N_s}]$ in a manner of laminating the extended coupling vectors.

In this case, a total precoding matrix corresponds to a Hadamard product (or Element-wise product) of an NPP matrix ($V_t$) combined with an extended linking matrix. The total precoding matrix can be represented as Equation 20 in the following.

$$U = \hat{A} \circ V_t$$ [Equation 20]

In the Equation 20, it may be able to represent as $V_t = [V_1^T \ldots V_M^T]^T$ and a matrix operator ○ indicates the Hadamard product.

An (extended) coupling vector and an (extended) linking matrix are commonly called a linking precoder. The reason why the coupling vector and the linking matrix are commonly called as a precoder is because the precoder corresponds to one of configuration elements for determining a total transmitting antenna precoder. As shown in the Equation 20, although the linking precoder is capable of being configured by one, by which the present invention may be non-limited. For example, a random partitioning can be additionally performed on a coupling vector $a_i$ and may be then able to configure a plurality of sub-linking vectors. By doing so, it may be able to define a sub-linking precoder. In the following description, for clarity, assume a single linking precoder. Yet, a partitioning scenario for a linking precoder is not excluded.

When the aforementioned linking coefficient is represented, although it is represented as linking coefficients different from each other are applied to transmission layers different from each other of an identical partition, if identical partitioning is applied according to a layer, a linking coefficient can be independently set to a transmission layer. In particular, an identical linking coefficient can be set to all layers. In this case, such a relation as $a□a_1 = \ldots = a_{N_s}$ is established between coupling vectors. In this case, a linking precoder can be represented by M or M−1 number of linking coefficients only.

Meanwhile, a MIMO precoding scheme can be mainly classified into a closed loop precoding scheme and an open loop precoding scheme. In general, since the closed loop precoding scheme considers a channel between a transmitter and a receiver when a MIMO precoder is configured, additional overhead such as feedback signal transmission and pilot signal transmission of a user equipment are required to estimate a MIMO channel in the transmitted. Yet, when a channel is precisely estimated, performance of the closed loop precoding scheme is superior to performance of the open loop precoding scheme. Since the closed loop precoding scheme requires estimation accuracy for a channel, the closed loop precoding scheme is mainly used in static environment (e.g., environment in which low Doppler spread and low delay spread exist) in which a channel change between the transmitter and the receiver is not significant. On the contrary, since the open loop precoding scheme has no correlation between the channel change between the transmitter and the receiver and a MIMO precoding scheme, the open loop precoding scheme shows superior performance in environment in which the channel change between the transmitter and the receiver is significant compared to the closed loop scheme.

In order to apply the closed loop precoding scheme to massive MIMO environment including the huge number of antennas, information on a sub precoder and information on a linking precoder are necessary, respectively. In this case, if codebook-based feedback is not applied, the information on the linking precoder may not be necessary. A property of a valid channel experienced by each sub precoder and a property of a valid channel experienced by a linking precoder may be different from each other depending on a partitioning scheme.

For example, a MIMO channel experienced by one sub precoder may have a relatively low Doppler spread property and a channel experienced by another sub precoder may have a high Doppler spread property. As a different example, a valid channel experienced by all sub precoders may have a similar Doppler property and a valid channel experienced by a linking precoder may have a different Doppler property. In the following, a fractional beamforming scheme for adaptively optimizing a MIMO transmission scheme to a property of each partitioned channel and a property of a linking channel in the classified precoding environment is explained.

<Fractional Beamforming>

A base station performs a closed loop precoding on a precoder for each antenna port partition and a part of linking precoders configured to link each of antenna port partitions with each other only. One of the following precoding schemes can be applied to the rest of the linking precoders.

1. A precoding scheme regulated by a system (hereinafter, a default precoding)
2. A precoding scheme designated by a base station or a network in advance (hereinafter, a reference precoding)
3. A precoding scheme randomly determined by a base station (hereinafter, a random precoding)

In the following, a partition to which a closed loop precoding is applied and/or a set of linking coefficients is called a control space and a partition to which the closed loop precoding is not applied and/or a set of linking coefficients is called a non-control space.

The default precoding scheme corresponding to the precoding scheme regulated by a system corresponds to a method of using a beam transmitted to a non-control space in a manner of regulating the beam by a system. A default precoding can be regulated to follow a random open loop precoding scheme. The default precoding can be differently configured according to a system bandwidth, the number of transmitting antenna of a base station, the number of transmission layers (or a transmission rank), configuration ($N_{t\_v}$, $N_{t\_h}$) of a transmitting antenna of the base station, or the number of transmitting antenna in non-control direction. Or, the default precoding can be configured by a specific beam irrespective of the aforementioned system parameters. And, the default precoding can be fixed over all frequency bands and time and may vary in a specific time resource unit and/or a frequency resource unit The reference precoding scheme corresponding to a precoding scheme designated by a base station or a network in advance corresponds to a method that the base station or the network designates a precoding scheme to be applied to a non-control space to a user equipment. Hence, reference precoding information on the non-control space is delivered to the user equipment via a physical layer or a higher layer message. The reference precoding information corresponds to all information capable of explicitly and implicitly notifying a MIMO precoder to be applied to the non-control space. For example, a specific index (PMI) of a PMI codebook corresponding to the number of transmitting antennas of the non-control space, a quantified value of each element of a MIMO precoding matrix of the non-control space, an index to be used for transmission after a plurality of MIMO precoding schemes are indexed and the like can be signaled as the reference precoding information.

The reference precoding may also vary in a specific time resource unit or a frequency resource unit. In this case, a reference precoding pattern used by the base station or the network can be signaled as the reference precoding information after a plurality of change patterns of the reference precoding are regulated according to the time/frequency resource. Or, a seed value of a random variable generator capable of inducing the change patterns according to the time/frequency resource can also be utilizes as the reference precoding information. Or, which one is to be used among various precoding schemes (e.g., STBC, delay diversity, etc.) can also be used as the reference precoding information.

Moreover, the random precoding scheme corresponding to a precoding scheme randomly determined by a base station corresponds to a method for the base station to randomly determine a precoding scheme to be applied to a non-control space. Hence, unlike the default precoding scheme or the reference precoding scheme, a user equipment is unable to know a precoder to be applied to the non-control space. As an example, the base station can transmit a randomly changing beam to the non-control space in a specific time resource unit (e.g., OFDM symbol) and/or a frequency resource unit (e.g., subcarrier).

According to the fractional beamforming scheme, it is able to apply independent partitioning and fractional beamforming scheme according to a transmission layer. Or, identical partitioning and fractional beamforming scheme can be applied to all transmission layers.

The fractional beamforming scheme is very useful when reliability of feedback information on partial antennas among transmitting antennas or reliability of feedback information on a linking coefficient is degraded or when the feedback is not necessary for channel environment. In particular, when reliability of feedback information on partial antennas or reliability of feedback information on a linking coefficient is degraded, it is able to prevent unnecessary packet reception error and retransmission from being occurred through a feedback information error. When the feedback is unnecessary, it is able to minimize feedback overhead.

<Aligned Fractional Precoding>

If all or a part of an antenna port partition has an identical size and a corresponding partitioned antenna array has a similar valid channel property, it is able to apply an identical precoding scheme, i.e., an aligned fractional precoding, to corresponding NPPs.

Figure 16:
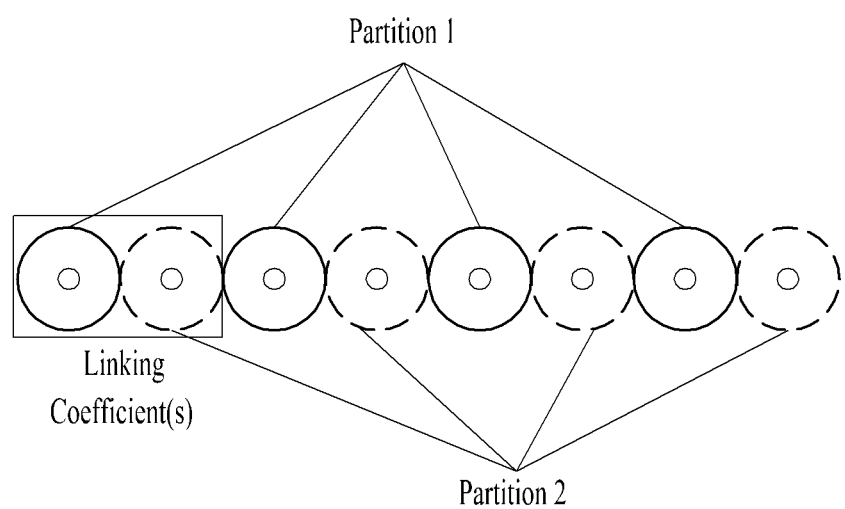
FIG. 16 is a diagram for an example of applying aligned fractional precoding in a uniform linear array.

FIG. 16 is a diagram for an example of applying aligned fractional precoding in a uniform linear array.

Referring to FIG. 16, in a uniform linear array (ULA) consisting of 8 antennas, assume that a first partition consists of $1^{st}$, $3^{rd}$, $5^{th}$ and $7^{th}$ antenna and a second partition consists of a $2^{nd}$, $4^{th}$, $6^{th}$ and $8^{th}$ antenna. If a space between antennas is dense and many scatterers do not exist around the antennas, it is highly probable that the first partition and the second partition are going to experience a similar MIMO channel except a phase difference between the first partition and the second partition corresponding to a linking precoder component. In this case, it is able to configure an identical precoding scheme to be applied to the two partitions.

Figure 17:
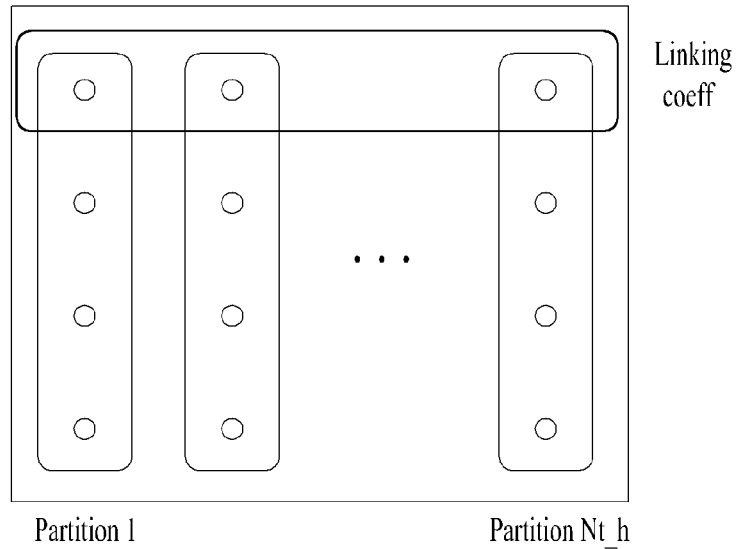
FIG. 17 is a diagram for an example of applying a column-based aligned fractional precoding in a square array.

FIG. 17 is a diagram for an example of applying a column-based aligned fractional precoding in a square array.

Referring to FIG. 17, in a square array consisting of $N_t$ (=$N_{t\_v} \times N_{t\_h}$) number of antennas in a form of $N_{t\_v}$ number of rows and $N_{t\_h}$ number of columns, each column is configured as a single partition. If a distance between columns is close enough and $N_{t\_h}$ is not big, it is able to configure an identical precoding scheme to be applied to all partitions. Yet, a linking vector is configured in a manner of being independent from a sub precoder.

Figure 18:
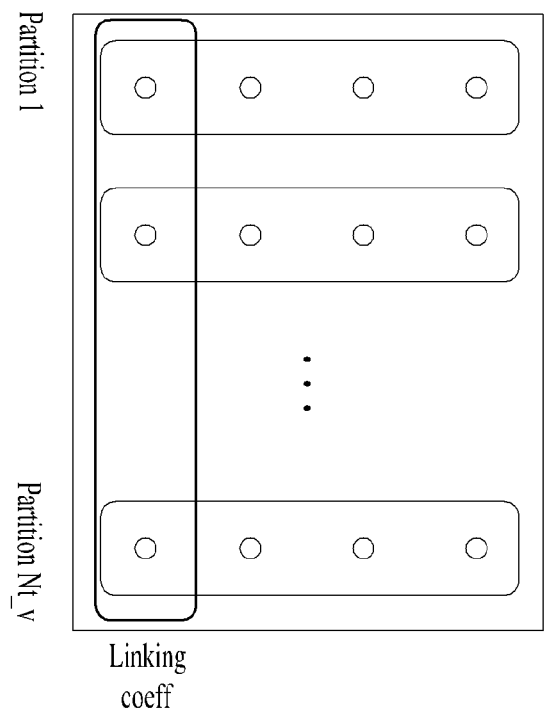
FIG. 18 is a diagram for an example of applying a row-based aligned fractional precoding in a square array.

FIG. 18 is a diagram for an example of applying a row-based aligned fractional precoding in a square array.

Referring to FIG. 18, in a square array consisting of $N_t$=$N_{t\_v} \times N_{t\_h}$) number of antennas in a form of $N_{t\_v}$ number of rows and $N_{t\_h}$ number of columns, each row is configured as a single partition. If a distance between rows is close enough and $N_{t\_v}$ is not big, it is able to configure an identical precoding scheme to be applied to all partitions. Yet, a linking vector is configured in a manner of being independent from a sub precoder.

Figure 19:
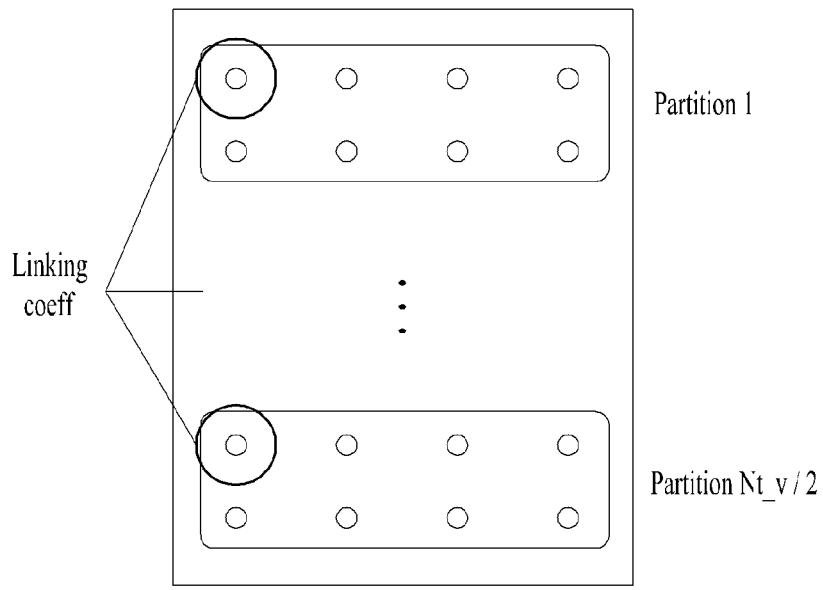
FIG. 19 is a diagram for an example of applying a row group-based aligned fractional precoding in a square array.

FIG. 19 is a diagram for an example of applying a row group-based aligned fractional precoding in a square array.

Referring to FIG. 19, in a square array consisting of $N_t$ (=$N_{t\_v} \times N_{t\_h}$) number of antennas in a form of $N_{t\_v}$ number of rows and $N_{t\_h}$ number of columns, a row group consisting of N number of rows is configured as a single partition. If a distance between row groups is close enough and $N_{t\_v}$ is not big, it is able to configure an identical precoding scheme to be applied to all partitions. Yet, a linking vector is configured in a manner of being independent from a sub precoder.

As shown in the examples of FIG. 16 to FIG. 19, if sizes of all partitions are same and an identical precoder is applied to all partitions (i.e., $v_i \square v_{i,1} = \ldots = v_{i,M}$), a precoder for an $i^{th}$ layer can be represented as Kronecker product of a linking precoder and a sub precoder as shown in Equation in the following.

$$u_i=[\alpha_{i,1}v_{i,1}^T \alpha_{i,2}v_{i,2}^T \ldots \alpha_{i,M}v_{i,M}^T]^T=$$
$$[\alpha_{i,1}v_i^T \alpha_{i,2}v_i^T \ldots \alpha_{i,M}v_i^T]^T=a_i \otimes v_i \quad \text{[Equation 21]}$$

And, if identical partitioning is performed on all transmission layers, a MIMO precoder for all layers can be represented as Khatri-Rao product (column-wise Kronecker product) of a linking matrix A of a size of M×$N_s$ and a sub precoding matrix V=[$v_1 \ldots v_{N_s}$] of a size of $$\frac{N_t}{M} \times N_s$$

as shown in Equation 22 in the following.

$$U=[a_1 \otimes v_1 \ldots a_{N_s} \otimes v_{N_s}]=A*V \quad \text{[Equation 22]}$$

As shown in FIG. 17, if each column is configured as a partition in two dimensional antenna port array environment, the sub precoder $v_i$ or V performs a vertical beamforming (or elevation beamforming) and the linking precoder $a_i$ or A performs a horizontal beamforming (or Azimuth beamforming). Similarly, as shown in FIG. 18, if each row is configured as a partition in two dimensional antenna port array environment, the sub precoder $v_i$ or V performs a horizontal beamforming and the linking precoder $a_i$ or A performs a vertical beamforming.

Consequently, as shown in the example or FIG. 17 or the example of FIG. 18, if a perfectly aligned fractional precoding is performed in row direction or column direction, a precoder performing 3 dimensional beamforming can be represented by a single sub precoder and a single linking precoder. In this case, one of the precoders performs vertical beamforming and another precoder performs horizontal beamforming.

If the proposed fractional beamforming is applied in environment in which the perfectly aligned fractional precoding is performed, a base station performs a closed loop precoding on one of the sub precoder and the linking precoder in environment in which a precoding for all partitions is matched with each other and the base station applies one among the default precoding, the reference precoding and the random precoding to the rest of the precoder.

As shown in FIG. 17 and FIG. 18, it is useful for performing 3D beamforming in environment consisting of two dimensional antenna arrays. The 3D beamforming, in particular, UE-specific 3D beamforming can optimize transmission capability by a horizontal and a vertical position of a UE and fading environment of a 3D space. Yet, in order to smoothly perform the UE-specific 3D beamforming using the closed loop precoding scheme, precise channel information (CSI) between the base station and the UE is required.

Since a difference between lowest performance value and highest performance value according to a MIMO transmission scheme becomes more severe due to the increase of the number of antennas of the base station and the increase of a beamforming order, performance sensitivity is more increased due to such a CSI estimation error factor of the base station as a channel estimation error, a feedback error, channel aging and the like. If the CSI estimation error of the base station is not significant, it may perform normal transmission with the help of such an effect as channel coding and the like. If the CSI estimation error of the base station is significant, a packet reception error occurs and packet retransmission occurs. Thus, severe performance degradation may occur.

For example, if 3D beamforming is performed on a base station and a UE quickly moving in horizontal direction, it is highly probable to perform packet retransmission. According to a legacy scheme, an open loop precoding scheme is used for the UE. Yet, since the UE experiences a static channel in vertical direction, it is profitable to use vertical beamforming for the UE. On the contrary, if a UE is quickly moving in vertical direction or a UE is in environment where scattering is severe in vertical direction, it is profitable to use horizontal beamforming for the UE. And, if a UE is located at a narrow and high building, a base station may fix horizontal beamforming direction in specific direction while 3D beamforming is performed on the UE located at the building. In particular, it is able to reduce feedback overhead in a manner of inducing the UE to configure feedback information for vertical beamforming only.

Hence, if fractional beamforming is applied to 3D beamforming environment, it is able to perform 2D beamforming (vertical beamforming or vertical beamforming) in accordance with user environment. In this aspect, the aforementioned scheme can also be called partial dimensional beamforming. For example, a base station equipped with a 2D transmission antenna port performs a closed loop precoding on one of a vertical precoder and a horizontal precoder and may be then able to apply one precoding scheme among the default precoding, the reference precoding and the random precoding to the rest of the precoder.

As mentioned in the foregoing description, in a fractional precoding scheme, each sub precoder and a linking precoder are defined in terms of data transmission of a base station. In terms of a UE, information on (PPI preferred precoding index) a preferred precoder can be transmitted to the base station. As a representative PPI, there is a PMI feedback scheme that matrix precoders are indexed and then a preferred index is fed back.

If partial feedback information is separated from each other by a partition and/or a unit consisting of values for linking partitions, pilot signals transmitted to a UE by a base station can also be linked with a set of specific antenna ports. The set of the pilot signals is called a pilot pattern. A representative pilot pattern corresponds to a NZP (non-zero-power) CSI-RS resource (or process) corresponding to a measurement pilot used in LTE system. For example, a mapping relation among a partition, a CSI-RS and PMI feedback described in the following can be defined.

A. Aligned Unit of Partition & Pilot Pattern & PMI Feedback 1. (Partition) A base station performs fractional precoding in a manner of configuring two partitions consisting of 8 antenna ports, respectively, in a system including 16 antenna ports.

2. (Pilot pattern) A base station allocates 8Tx NZP CSI-RS resource to each partition to support fractional precoding. In particular, the base station sets two co-located NZP CSI-RS resources to a user equipment.

3. (PMI feedback) A user equipment feeds back PMI1, PMI2 and linking coefficients (e.g., PMI3 for a linking precoder) configured to link the PMI1 and the PMI 2 with each other for two antenna port partitions.

In particular, in case of allocating a separate NZP CSI-RS resource to each antenna port partition, a base station can set a plurality of NZP CSI-RS resources to a user equipment for a plurality of co-located (or synchronized) antenna port partitions belonging to a single base station (or transmission point). In this case, in order to distinguish a non-co-located antenna port pattern, which is utilized for CoMP transmission and the like, from the co-located antenna port patterns, a base station can additionally inform a user equipment of whether NZP CSI-RS resources are co-located. For example, the base station can inform the user equipment of a QCL (quasi-co-location) condition among a plurality of the NZP CSI-RS resources.

Unlike the aforementioned example, it is not mandatory that a pilot transmission unit is matched with an antenna port partition unit. For example, in a state that a single 8tx CSI-RS resource is set, a user equipment may configure feedback information on two 4tx partitions. And, it is not mandatory that an antenna port partition unit is matched with a feedback unit. In particular, in case of aligned fractional precoding, since common PPI feedback information can be fed back to partitions to which an identical precoding is applied, a single feedback unit can be configured for a plurality of partitions.

B. Not Aligned Unit of Partition & Pilot Pattern & PMI Feedback 1. (Partition) Assume that antenna port partitioning is configured in a manner of being identical to FIG. 18.

2. (PMI feedback) Feedback information consists of a PPI (hereinafter, common PPI) capable of being commonly applied to all partitions and linking coefficients in consideration of a case of perfectly aligned fractional precoding. In this case, it may consider that a partition unit and a feedback unit are different from each other.

Figure 20:
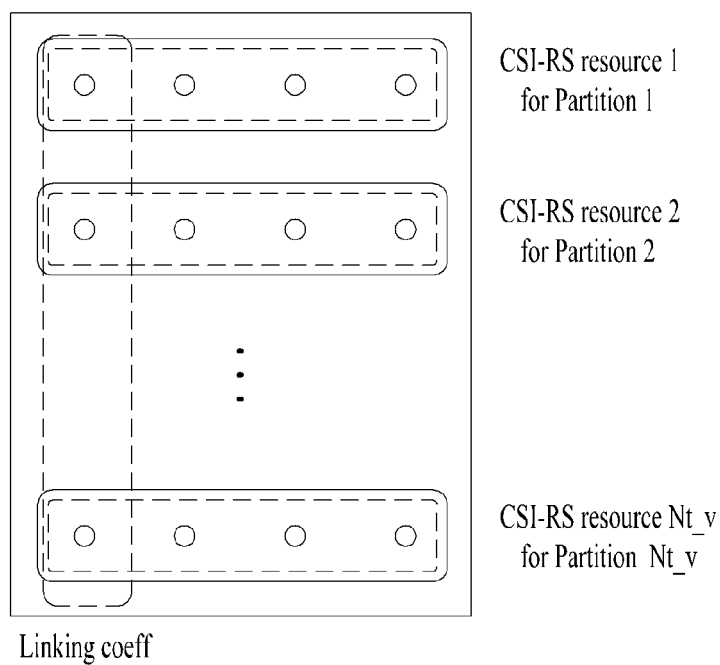
FIGS. 20 to 22 are diagrams for examples of methods of assigning a pilot pattern.
Figure 21:
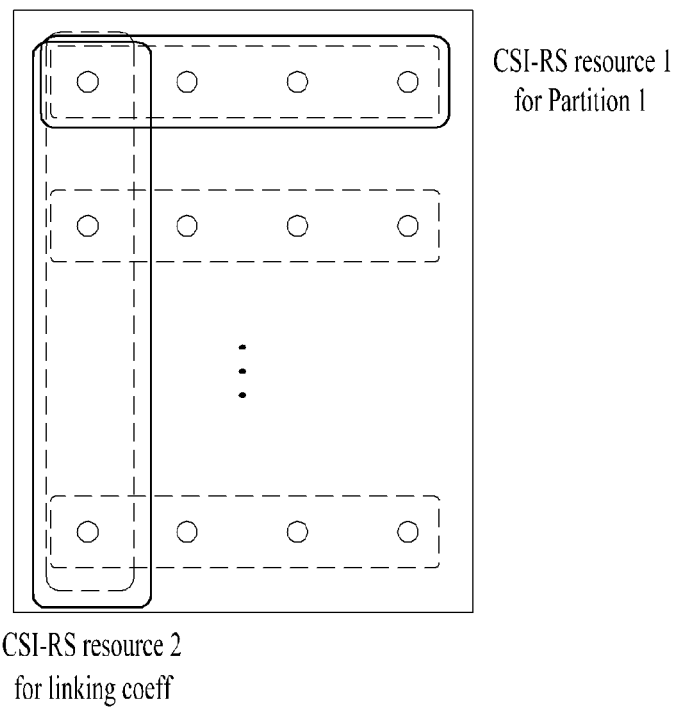
Figure 22:
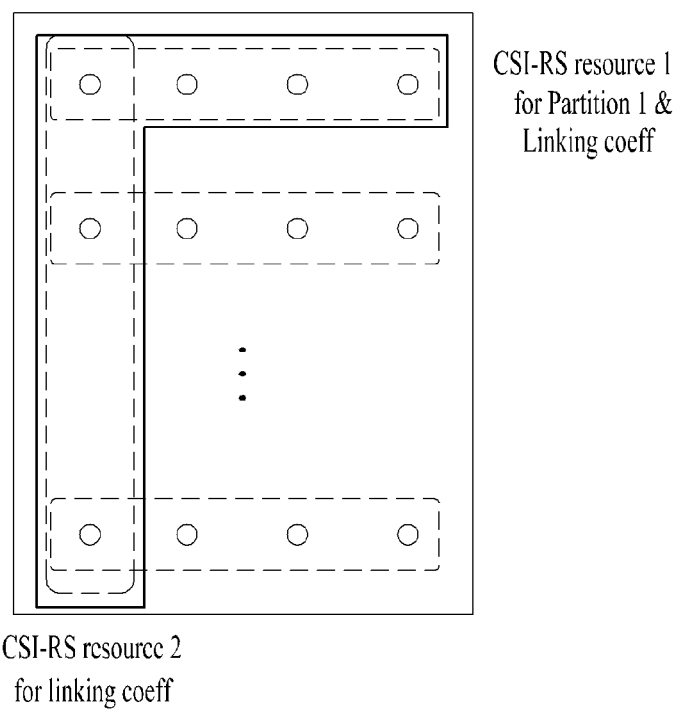

3. (Pilot pattern) A method of assigning a pilot pattern may vary. FIGS. 20 to 22 show examples for methods of assigning a pilot pattern. Specifically, as shown in FIG. 20, a separate pilot resource can be set according to each partition. As shown in FIG. 21, in order to enable a user equipment to calculate a common PPI, one pilot pattern is transmitted to a first partition and another pilot pattern can be transmitted to antenna ports to which a linking precoder is applied to enable the user equipment to calculate linking coefficient values. Or, as shown in FIG. 22, it may be able to configure a single pilot pattern only to enable the user equipment to calculate the common PPI and the linking coefficients at a time.

Meanwhile, as mentioned in the foregoing description, a user equipment should transmit a pilot or feedback information to support a closed loop MIMO precoding. In general, since UL frequency band and DL frequency band are different from each other in a FDD (frequency division duplexing) system, if the user equipment transmits a pilot and a base station estimates downlink channel using channel symmetry, it is not appropriate for estimating a downlink channel. Hence, it is preferable that feedback information is configured and transmitted.

Feedback information can be classified into explicit information and implicit information and implicit information of a PPI (preferred precoder index) form is mainly used in consideration of feedback overhead. In order to support a closed loop precoding using implicit feedback, PPI information on each partition precoder and PPI information on a linking precoder can be configured as feedback information.

The present invention proposes a feedback scheme in a perfectly aligned precoding in which precoders of all partitions are identically configured. As mentioned in the foregoing description, in order to perform the perfectly aligned precoding, a transmitter should determine a common partitioned precoder commonly applied to all antenna port partitions and a linking precoder to connect antenna port partitions with each other. Hence, a user equipment, which is a receiver, should configure feedback information to enable the transmitter, which is a base station, to efficiently select the partitioned precoder and the linking precoder. A method for the user equipment to configure the feedback information is closely related to a method for the base station to transmit a pilot signal.

As shown in FIG. 20, let's consider a case of transmitting a separate pilot pattern according to an antenna port partition. In this case, a user equipment configures feedback information as follows.

1) A PPI commonly applied to a pilot pattern where QCL assumption is available

2) Linking coefficient information (e.g., PPI for a linking precoder) for linking a PPI with a pilot pattern where QCL assumption is available 3) RI (rank indicator)

4) CQI in case of applying the aforementioned 1) to 3)

As mentioned in the foregoing description, a pilot pattern can be interpreted as a NZP CSI-RS resource or a CSI process in LTE system. In particular, a pilot pattern may correspond to (1) an NZP CSI-RS resource, (2) a CSI process, or (3) an NZP CSI-RS resource included in a CSI process in LTE system. In particular, in case of (3), LTE system considers not only a case of including an NZP CSI-RS resource in a CSI process but also a case of including a plurality of NZP CSI-RS resources in a CSI process. If a precoder is constructed by a matrix form, the PPI can be represented as PMI.

The present invention can be selectively applied to pilot patterns only of which QCL assumption is available, which are transmitted from an identical transmission point by a user equipment. An example of a method for the user equipment to determine whether QCL assumption is available among a plurality of pilot patterns is described in the following.

1. A base station can explicitly or implicitly inform a user equipment of whether QCL assumption is available between pilot patterns.

For example, an indicator indicating whether QCL assumption is available can be included in a plurality of NZP CSI-RS resources or a plurality of CSI processes. Or, information on NZP CSI-RS resources of which QCL assumption is available can be separately informed via RRC signaling. Additionally, a user equipment may consider that QCL assumption is available for all of a plurality of NZP CSI-RS resources existing in a single CSI process. In this case, it is preferable that a base station configures NZP CSI-RS resources of which QCL assumption is available in a single CSI process.

2. Or, a user equipment can autonomously determine whether QCL assumption is available among pilot patterns.

For example, a difference of reception timing offset is calculated for each of pilot patterns and the user equipment can determine whether QCL assumption is available. Specifically, if a difference of reception timing offset of a pilot pattern is less than a threshold value, the pilot pattern can be determined as a pilot pattern of which QCL assumption is available. Or, it is able to determine whether QCL assumption is available using a channel property estimated by each pilot pattern. Specifically, if a property of a channel estimated by a pilot pattern is similar, the pilot pattern can be determined as a pilot pattern of which QCL assumption is available.

Meanwhile, a user equipment may be able to use the aforementioned information 1), i.e., a PPI commonly applied to a pilot pattern of which QCL assumption is available, using one of schemes described in the following.

A) It may be able to apply both a common PPI commonly applied to channels estimated by each pilot pattern and candidates of a linking coefficient and may be then able to select a common PPI of maximum performance and a linking coefficient set at the same time based on the common PPI and the candidates of the linking coefficient. In particular, this scheme corresponds to a scheme of calculating the information 1) and the information 2) at the same time.

B) Subsequently, it may firstly apply a phase difference between pilot patterns to a linking coefficient and may be then able to calculate a PPI for an average channel in a manner of calculating an average of channels estimated by each pilot pattern.

C) Lastly, it may firstly calculate a PPI for each pilot pattern and may be then able to additionally calculate a common PPI. In this case, a scheme of calculating the common PPI from PPIs for each pilot pattern may vary. For example, a PPI closest to an average value of the PPIs or a PPI of which reliability for a channel estimation value is highest can be calculated as the common PPI.

Meanwhile, in case of calculating the information 2), as mentioned earlier in A), a user equipment can calculate the information 2) at the same time. Or, the user equipment may preferentially calculate a common PPI and may be then able to calculate a linking coefficient for optimizing performance of the common PPI. Or, as mentioned earlier in B), it may preferentially calculate a linking coefficient based on channels estimated by a first pilot of each pilot pattern and may be then able to calculate a common PPI. Or, a common PPI and a linking coefficient can be calculated in a manner of being independent from each other without a correlation.

In addition, in case of calculating the information 3), i.e., an RI, it may be preferable that optimized information 1) and 2) are preferentially calculated according to each rank and then an RI capable of optimizing performance is selected. Of course, the information 4) corresponds to a CQI value to which the finally selected information 1) to 3) is applied.

If each pilot pattern is transmitted in row direction or column direction in 2D array environment, the information 1) and the information 2) can be applied in a manner of being replaced with a PPI for horizontal beamforming and a PPI for vertical beamforming, respectively. Of course, the information 1) and the information 2) can be applied in a manner of being replaced with a PPI for vertical beamforming and a PPI for horizontal beamforming, respectively.

In the following, more specific embodiment is explained. First of all, as shown in FIG. 20, assume that a pilot pattern is transmitted in row direction. In this case, examples for various methods of determining a feedback granularity in LTE system are described in the following description.

Common PPI (or Precoder for Horizontal Beamforming)

First of all, a case of configuring a common PPI with a sub band common PPI is considered. If a pilot pattern is configured with antenna ports equal to or less than 4 antenna ports, a single PMI applied by a sub band is fed back. Yet, if a pilot pattern is configured with antenna ports equal to or greater than 8 antenna ports, first PMI applied by a wide band and second PMI applied by a sub band are fed back.

And, a case of configuring a common PPI with a wideband common PPI is considered. If a pilot pattern is configured with antenna ports equal to or less than 4 antenna ports, a single PMI applied by a wideband is fed back. Yet, if a pilot pattern is configured with antenna ports equal to or greater than 8 antenna ports, first PMI and second PMI applied by a wideband are fed back.

Linking PPI (or Precoder for Horizontal Beamforming) and CQI

For a linking PPI and CQI, it may consider feedback modes including a mode 1 to a mode 6 in the following in relation to the sub band application or the wideband application of the common PPI.

mode 1: common PPI→sub band, linking PPI→sub band, CQI→sub band mode 2: common PPI→sub band, linking PPI→wideband, CQI→sub band mode 3: common PPI→wideband, linking PPI→wideband, CQI→sub band mode 4: common PPI→sub band, linking PPI→sub band, CQI→wideband mode 5: common PPI→sub band, linking PPI→wideband, CQI→wideband mode 6: common PPI→wideband, linking PPI→wideband, CQI→wideband Yet, it is preferable that an RI (rank indicator) is applied by wideband feedback information.

Meanwhile, if a base station and a user equipment are in LoS (line of sight) environment, i.e., if the user equipment is located at a high rise building, vertical beamforming can obtain a considerable gain in general. Hence, although a PPI for horizontal beamforming is fed back by a sub band unit, it is not mandatory to feedback a PPI for vertical beamforming by a sub band unit. Thus, such a feedback mode as the mode 2 or the mode 5 may correspond to a feedback mode capable of optimizing performance compared to feedback overhead.

The aforementioned feedback modes are just an example. The present invention may be non-limited by the modes. For example, an RI of a sub band unit can be fed back. Or, a linking PPI can be applied by a sub band unit while a common PPI is applied to a wideband.

In the present invention, it is assumed that a single CQI is fed back to all transmission layers, by which the present invention may be non-limited. For example, in case of transmitting a plurality of layers in LTE system, it may be able to feedback CQI in a unit of a codeword corresponding to a group to which an identical MCS level is applied. In this case, the CQI described in the embodiment of the present invention can be applied as 'single CQI per codeword'.

Moreover, it is not mandatory that a PPI or PMI is represented by a single index. For example, when a base station transmits a signal through the total 8 antenna ports, LTE system regulates a user equipment to feedback two PMIs. Hence, if a single pilot pattern consists of 8 or more antenna ports, two or more PMIs can be used for representing a preferred index for the pilot pattern.

If feedback information proposed by the present invention is applied to a wideband system, the feedback information is divided into specific frequency domains (e.g., a sub band, a subcarrier, a resource block, etc.) and separate feedback information set can be fed back to each frequency domain. Or, the feedback information can be transmitted to a specific frequency domain selected by a user equipment or designated by a base station only. The frequency domain can be configured by one or more domains of which frequency is contiguous or one or more domains of which frequency is not contiguous.

Figure 23:
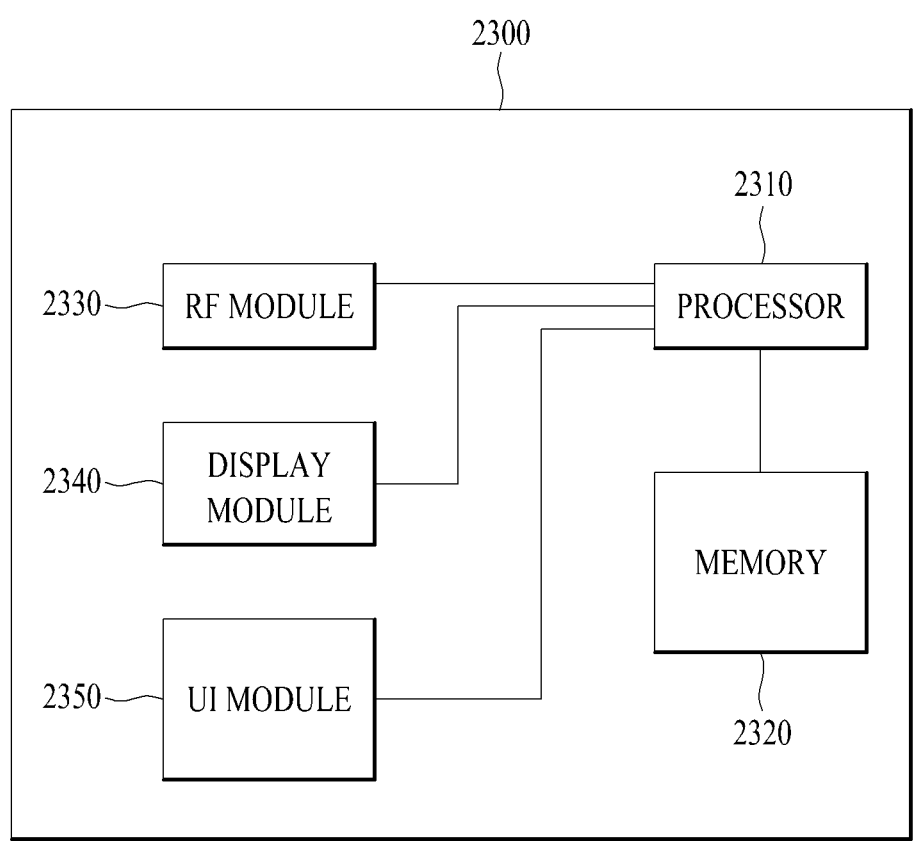
FIG. 23 is a block diagram for an example of a communication device according to one embodiment of the present invention.

FIG. 23 is a block diagram for an example of a communication device according to one embodiment of the present invention.

Referring to FIG. 23, a communication device 2300 includes a processor 2310, a memory 2320, an RF module 2330, a display module 2340, and a user Interface module 2350.

The communication device 2300 is shown as having the configuration illustrated in FIG. 23, for the convenience of description. Some modules may be added to or omitted from the communication device 2300. In addition, a module of the communication device 2300 may be divided into more modules. The processor 2310 is configured to perform operations according to the embodiments of the present invention described before with reference to the drawings. Specifically, for detailed operations of the processor 2310, the descriptions of FIGS. 1 to 22 may be referred to.

The memory 2320 is connected to the processor 2310 and stores an Operating System (OS), applications, program codes, data, etc. The RF module 2330, which is connected to the processor 2310, upconverts a baseband signal to an RF signal or downconverts an RF signal to a baseband signal. For this purpose, the RF module 2330 performs digital-to-analog conversion, amplification, filtering, and frequency upconversion or performs these processes reversely. The display module 2340 is connected to the processor 2310 and displays various types of information. The display module 2340 may be configured as, not limited to, a known component such as a Liquid Crystal Display (LCD), a Light Emitting Diode (LED) display, and an Organic Light Emitting Diode (OLED) display. The UI module 2350 is connected to the processor 2310 and may be configured with a combination of known user interfaces such as a keypad, a touch screen, etc.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

A specific operation described as performed by a BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc.

The embodiments of the present invention may be achieved by various means, for example, hardware, firmware, software, or a combination thereof. In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

Although a method of reporting channel state information for three dimensional beamforming in a wireless communication system and an apparatus therefor are described with reference to examples applied to 3GPP LTE system, it may be applicable to various kinds of wireless communication systems as well as the 3GPP LTE system.

What is claimed:

1. A method of reporting channel state information reported to a base station by a user equipment for beamforming based on multiple antennas in a wireless communication system, the method comprising:
   receiving information on a plurality of reference signal resources from the base station;
   generating channel state information containing information on a single preferred precoder to be commonly applied to the plurality of the reference signal resources and information on a single linking precoder for linking the plurality of the reference signal resources; and
   reporting the channel state information to the base station,
   wherein the multiple antennas are partitioned by partitions of a row unit or partitions of a column unit, and
   wherein each of the plurality of the reference signal resources correspond to a respective one of the partitions.

2. The method of claim 1, wherein the channel state information comprises a rank indicator, and
   wherein the rank indicator indicates an optimized rank when the single preferred precoder and the single linking precoder are applied.

3. The method of claim 2, wherein the channel state information comprises a single channel quality indicator, and
   wherein the single channel quality indicator indicates channel quality when the single preferred precoder, the single linking precoder and the optimized rank are applied.

4. The method of claim 1, wherein QCL (quasi co-located) assumption of a plurality of the reference signal resources is available.

5. The method of claim 4, further comprising:
   receiving information on whether the QCL (quasi co-located) assumption of a plurality of the reference resources is available from the base station.

6. The method of claim 5, wherein a plurality of the reference signal resources of which the QCL assumption is available are considered as a large scale property is identical to each other.

7. The method of claim 6, wherein the large scale property comprises at least one of Doppler spread, Doppler shift, average delay, and delay spread.

8. The method of claim 1, wherein the partitions are in a perfectly aligned state.

9. A method of receiving channel state information received from a user equipment by a base station for beamforming based on multiple antennas in a wireless communication system, the method comprising:
   transmitting information on a plurality of reference signal resources to the user equipment; and
   receiving channel state information containing information on a single preferred precoder to be commonly applied to the plurality of the reference signal resources and information on a single linking precoder for linking the plurality of the reference signal resources,
   wherein the multiple antennas are partitioned by partitions of a row unit or partitions of a column unit, and
   wherein each of the plurality of the reference signal resources correspond to a respective one of the partitions.

10. The method of claim 9, wherein the channel state information comprises a rank indicator and wherein the rank indicator indicates an optimized rank when the single preferred precoder and the single linking precoder are applied.

11. The method of claim 10, wherein the channel state information comprises a single channel quality indicator and wherein the single channel quality indicator indicates channel quality when the single preferred precoder, the single linking precoder and the optimized rank are applied.

12. The method of claim 9, wherein QCL (quasi co-located) assumption of a plurality of the reference signal resources is available.

13. The method of claim 12, further comprising:
   transmitting information on whether the QCL (quasi co-located) assumption of a plurality of the reference resources is available to the user equipment.

14. The method of claim 13, wherein a plurality of the reference signal resources of which the QCL assumption is available are considered as a large scale property is identical to each other.

15. The method of claim 14, wherein the large scale property comprises at least one selected from the group consisting of Doppler spread, Doppler shift, average delay, and delay spread.

16. The method of claim 9, wherein the partitions are in a perfectly aligned state.

17. A user equipment configured to report channel state information reported to a base station for beamforming based on multiple antennas in a wireless communication system, the user equipment comprising:
   a transceiver; and
   a processor operatively connected to the transceiver and configured to:
      receive information on a plurality of reference signal resources from the base station;
      generate channel state information containing information on a single preferred precoder to be commonly applied to the plurality of the reference signal resources and information on a single linking precoder for linking the plurality of the reference signal resources; and
      report the channel state information to the base station,
      wherein the multiple antennas are partitioned by partitions of a row unit or partitions of a column unit, and
      wherein each of the plurality of the reference signal resources correspond to a respective one of the partitions.

* * * * *